United States Patent [19]

Sydansk et al.

[11] Patent Number: 4,683,949

[45] Date of Patent: Aug. 4, 1987

[54] CONFORMANCE IMPROVEMENT IN A SUBTERRANEAN HYDROCARBON-BEARING FORMATION USING A POLYMER GEL

[75] Inventors: Robert D. Sydansk, Littleton; Perry A. Argabright, Larkspur, both of Colo.

[73] Assignee: Marathon Oil Company, Findlay, Ohio

[21] Appl. No.: 822,709

[22] Filed: Jan. 27, 1986

Related U.S. Application Data

[63] Continuation-in-part of Ser. No. 807,416, Dec. 10, 1985, abandoned.

[51] Int. Cl.$^4$ ............................................. E21B 33/138
[52] U.S. Cl. ................................... 166/270; 166/294; 166/295; 523/130
[58] Field of Search ............... 166/270, 294, 295, 300; 405/264; 523/130, 132

[56] References Cited

U.S. PATENT DOCUMENTS

| | | | |
|---|---|---|---|
| 3,114,651 | 12/1963 | Gentile | 117/6 |
| 3,383,307 | 5/1968 | Goetz | 252/316 |
| 3,554,287 | 1/1971 | Eilers et al. | 166/295 |
| 3,658,129 | 4/1972 | Lanning et al. | 166/270 |
| 3,762,476 | 10/1973 | Gall | 166/294 |
| 3,833,061 | 9/1974 | Gall | 166/294 |
| 3,926,258 | 12/1975 | Hessert et al. | 166/294 |
| 3,949,811 | 4/1976 | Threlkeld et al. | 166/294 |
| 3,978,928 | 9/1976 | Clampitt | 166/294 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,069,869 | 1/1978 | Sandiford | 166/270 |
| 4,193,453 | 3/1980 | Golinkin | 166/295 |
| 4,291,069 | 9/1981 | Pilny | 166/295 X |
| 4,413,680 | 11/1983 | Sandiford et al. | 166/270 |
| 4,433,727 | 2/1984 | Argabright et al. | 166/252 |
| 4,488,601 | 12/1984 | Hammett | 166/270 |
| 4,498,539 | 2/1985 | Bruning | 166/294 |
| 4,503,912 | 3/1985 | Norton | 166/295 |
| 4,534,412 | 8/1985 | Dovan et al. | 166/295 |
| 4,552,217 | 11/1985 | Wu et al. | 166/270 |
| 4,606,407 | 8/1986 | Shu | 166/270 |

OTHER PUBLICATIONS

Von Erdman, "Condensation of Mononuclear Chromium (III) Salts to Polynuclear Compounds," *Das Leder*, Eduard Roether Verlag, Darmstadt, Germany, 1963, v. 14, p. 249–266.

Udy, Marvin J., Chromium, vol. 1: *Chemistry of Chromium and Its Compounds*, Reinhold Publishing Corp., N.Y., 1956, pp. 229–233.

Cotton and Wilkinson, *Advanced Inorganic Chemistry* 3rd Ed., John Wiley & Sons, Inc., N.Y., 1972, pp. 836–839.

Shuttleworth and Russel, *Journal of The Society of Leather Trades' Chemists*, "The Kinetics of Chrome Tannage Part I.," United Kingdom, 1965, v. 49, pp. 133–154.

Shuttleworth and Russel, *Journal of The Society of Leather Trades' Chemists*, "Part III.," United Kingdom, 1965, v. 49, pp. 251–260.

Shuttleworth and Russel, *Journal of The Society of Leather Trades' Chemists*, "Part IV.," United Kingdom, 1965, v. 49, pp. 261–268.

*Primary Examiner*—George A. Suchfield
*Attorney, Agent, or Firm*—Jack L. Hummel; Rodney F. Brown

[57] ABSTRACT

Conformance improvement is achieved in a subterranean hydrocarbon-bearing formation using a gel comprised of a high molecular weight water-soluble acrylamide polymer, a chromium III/carboxylate complex capable of crosslinking the polymer and an aqueous solvent. The gel components are combined at the surface and injected into the desired treatment zone via a wellbore to form a continuous single-phase gel. The gel is tailored to a specific subterranean application by first determining the treatment demands of the desired subterranean zone, then predetermining the gelation rate and resultant gel strength and stability which are required of a gel to meet the demands, and finally producing the gel having the required predetermined properties under controlled surface conditions by utilizing observed correlations between specific controllable gelation parameters and resultant gel properties.

62 Claims, No Drawings

CONFORMANCE IMPROVEMENT IN A SUBTERRANEAN HYDROCARBON-BEARING FORMATION USING A POLYMER GEL

DESCRIPTION

This is a continuation-in-part application of copending application Ser. No. 807,416 filed on Dec. 10, 1985, now abandoned.

BACKGROUND OF THE INVENTION

1. Technical Field

The invention relates to a process for reducing the permeability in a relatively high permeability region of a subterranean hydrocarbon-bearing formation and more particularly to a process for improving areal and vertical conformance and flow profiles at or away from a production and/or injection wellbore penetrating the hydrocarbon-bearing formation.

2. Description of Related Art

Poor vertical conformance results from the vertical juxtaposition of relatively high permeability geologic zones to relatively low permeability zones within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein gel compositions are formed in high permeability zones of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment zone of the formation and gel in situ.

It is generally held that effective polymer/crosslinking agent systems necessitate sequential injection of the gel components because gel systems mixed on the surface often set up before they can effectively penetrate the treatment region. However, in practice, treatments such as that disclosed in U.S. Pat. No. 3,762,476 using sequentially injected gel systems have proven unsatisfactory because of the inability to achieve complete mixing and gelation in the formation. As a result, gels only form at the interface of the unmixed gel components and often in regions remote from the desired treatment region. A need exists for a gelation process capable of forming gels having a predetermined gelation rate, strength, and stability to satisfy the particular demands of a desired treatment region in a subterranean hydrocarbon-bearing formation.

SUMMARY OF THE INVENTION

The present invention provides a process for improving vertical and areal conformance in a subterranean hydrocarbon-bearing formation penetrated by a production and/or injection well and for correspondingly improving flow profiles and sweep efficiencies of injected and/or produced fluids in the formation. The objectives are achieved by means of a tailor-made flowing or non-flowing polymer gel.

The gel comprises a high molecular weight, water-soluble acrylamide polymer and a crosslinking agent comprised of complex ions and/or molecules. The gel is prepared by forming a gelation solution above ground containing the polymer and crosslinking agent and injecting the solution into the desired treatment region via a wellbore in fluid communication therewith. The gelation solution is advantageously at least partially gelled by the time it reaches the treatment region to inhibit or prevent its propagation into adjoining regions where no treatment is desired. The final gel is a continuous single-phase gel which substantially reduces permeability in the treatment region.

After the gelation treatment, fluids may be injected into or produced from the hydrocarbon-bearing regions of the formation in fluid communication with the wellbore. The gel is substantially incapable of flowing from the treatment region and is substantially permanent and resistant to in situ degradation.

The process provides distinct advantages over gelation processes known in the art. The practitioner of the present invention customizes or tailors a gel to a specific subterranean application by first determining the treatment demands of a desired subterranean region. Given these treatment demands, one can predetermine the gelation rate and resultant gel strength and stability which are required of a gel to meet the demands. Thereafter, a gel having the required predetermined properties is produced under controlled conditions at the surface by utilizing observed correlations between specific controllable gelation parameters and resultant gel properties.

DESCRIPTION OF THE PREFERRED EMBODIMENTS

The present invention is described in the context of specific terms which are defined as follows. The formation consists of two general regions, the "matrix" and "anomalies." An "anomaly" is a volume or void space in the formation having very high permeability relative to the matrix. It is inclusive of terms such as streaks, fractures, fracture networks, vugs, solution channels, caverns, washouts, cavities, etc. The "matrix" is substantially the remainder of the formation volume characterized as essentially homogeneous, continuous, sedimentary reservoir material free of anomalies and often competent.

The matrix consists of horizontal "zones" of distinctive subterranean material of continuous geologic properties which extend in the horizontal direction. "Vertical conformance" is a measure of the degree of geologic uniformity in permeability as one moves vertically across the formation. "Areal conformance" is a measure of the degree of geologic uniformity in permeability as one moves horizontally across the formation. A "flow profile" qualitatively describes the uniformity of fluid flow through a subterranean formation while "sweep efficiency" is the quantitative analog of "flow profile." "Plugging" is a substantial reduction in permeability in a region of a formation.

The term "gel" as used herein is directed to a continuous three-dimensional crosslinked polymeric network having an ultra high molecular weight. The gel is qualitatively defined as "flowing" or "non-flowing" based on its ability to flow under the force of gravity when unconfined on the surface at ambient atmospheric conditions. A flowing gel flows under these conditions; a non-flowing gel does not. Nonetheless, both a non-flowing gel and a flowing gel are defined herein as having sufficient structure so as not to propagate from the confines of the desired treatment region into a less permeable adjoining region when injected into the subterranean treatment region.

Partially gelled solutions are also referred to herein. A partially gelled solution is at least somewhat more viscous than an uncrosslinked polymer solution such that it is incapable of entering a less permeable region where no treatment is desired, but sufficiently fluid such that it is capable of displacement into a desired treatment zone. The crosslinking agent of the partially gelled solution has reacted incompletely with the polymer, but is capable of continued reaction to completion thereafter, resulting in the desired gel.

The gel composition utilized in the present invention is comprised of an acrylamide polymer and a crosslinking agent. The acrylamide polymer is either polyacrylamide or partially hydrolyzed polyacrylamide, depending on the number of carboxylate groups it has. An acrylamide polymer having substantially less than 1% of the acrylamide groups in the form of carboxylate groups is termed polyacrylamide (PA); an acrylamide polymer having at least 1% but not 100% of the acrylamide groups in the form of carboxylate groups is termed partially hydrolyzed polyacrylamide (PHPA). The average molecular weight of the acrylamide polymer is in the range of about 10,000 to about 50,000,000 and preferably about 100,000 to about 20,000,000, and most preferably about 200,000 to about 12,000,000.

The crosslinking agent is a complex or mixture of complexes. The term "complex" is defined herein as an ion or molecule containing two or more interassociated ionic, radical or molecular species. A complex ion as a whole has a distinct electrical charge while a complex molecule is electrically neutral.

The complex of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Representative formulae of such complexes incude:

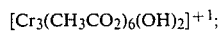
$[Cr_3(CH_3CO_2)_6(OH)_2]^{+1}$;

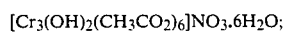
$[Cr_3(OH)_2(CH_3CO_2)_6]NO_3 \cdot 6H_2O$;

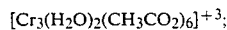
$[Cr_3(H_2O)_2(CH_3CO_2)_6]^{+3}$;

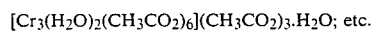
$[Cr_3(H_2O)_2(CH_3CO_2)_6](CH_3CO_2)_3 \cdot H_2O$; etc.

Trivalent chromium and chromic ion are equivalent terms encompassed by the term chromium III species as used herein. The carboxylate species are advantageously derived from water-soluble salts of carboxylic acids, especially low molecular weight mono-basic acids. Carboxylate species derived from salts of formic, acetic, propionic, and lactic acid, lower substituted derivatives thereof and mixtures thereof are especially preferred. The carboxylate species include the following water-soluble species: formate, acetate, propionate, lactate, lower substituted derivatives thereof, and mixtures thereof. The optional inorganic ions include sodium, sulfate, nitrate and chloride ions.

A host of complexes of the type described above and their method of preparation are well known in the leather tanning art. These complexes are described in Shuttleworth and Russel, *Journal of The Society of Leather Trades' Chemists*, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, *Das Leder*, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., *Chromium, Volume 1: Chemistry of Chromium and its Compounds*, Reinhold Publishing Corp., N.Y., 1956, pp. 229-233; and Cotton and Wilkinson, *Advanced Inorganic Chemistry 3rd Ed.*, John Wiley & Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

The gel is formed by admixing an acrylamide polymer and crosslinking agent at the surface to form an injectable gelation solution. Surface admixing broadly encompasses inter alia mixing the solution in bulk at the surface prior to injection or simultaneously mixing the solution at or near the wellhead by in-line mixing means while injecting it. Admixing is accomplished for example by dissolving the starting materials for the crosslinking agent in an appropriate aqueous solvent. Exemplary starting materials include solid $CrAc_3 \cdot H_2O$, solid $Cr_3Ac_7(OH)_2$ or a solution labeled "Chromic Acetate 50% Solution" commercially available, for example, from McGean Chemical Co., Inc., 1250 Terminal Tower, Cleveland, Ohio 44113, U.S.A. The crosslinking agent solution is then mixed with an aqueous polymer solution to produce the gelation solution. Among other alternatives, the starting materials for the crosslinking agent can be dissolved directly in the aqueous polymer solution to form the gelation solution in a single step.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure.

The present process enables the practitioner to customize or tailor-make a gel having a predetermined gelation rate and predetermined gel properties of strength and stability from the above-described composition. The gelation rate is defined as the degree of gel formation as a function of time or, synonymously, the rate of crosslinking in the gelation solution. The degree of crosslinking may be quantified in terms of gel viscosity and/or strength. Gel strength of a non-flowing is defined as the coherence of the gel network or resistance to deformation under external forces. Gel strength of a flowing gel is defined as the resistance of the gel to filtration or flow. Stability is defined as either thermal or phase stability. Thermal stability is the ability of a gel to withstand temperature extremes without degradation. Phase stability is the ability of a gel to resist syneresis which can detract from the gel structure and performance.

Tailor-making or customizing a gel in the manner of the present invention to meet the demands of a particular treatment region is provided in part by correlating the independent gelation parameters with the dependent variables of gelation rate and resultant gel strength and stability. The independent gelation parameters are the surface and in situ gelation conditions including: temperature, pH, ionic strength and specific electrolytic makeup of the solvent, polymer concentration, ratio of the weight of polymer to the combined weight of chromium III and carboxylate species in the mixture, degree of polymer hydrolysis, and average molecular weight of the polymer.

The operable ranges of the gelation parameters are correlated with the dependent variables of gelation rate and resultant gel properties by means including qualitative bottle testing, quantitative viscosimetric analysis, packed-column flooding, and core flooding. The operable ranges of a number of gelation parameters and their correlation with the dependent variables are described below.

The lower temperature limit of the gelation solution at the surface is the freezing point of the solution and the upper limit is essentially the thermal stability limit of the polymer. The solution is generally maintained at ambient temperature or higher at the surface. The temperature may be adjusted by heating or cooling the aqueous solvent. Increasing the temperature within the prescribed range increases the gelation rate.

The initial pH of the gelation solution is within a range of about 3 to 13 and preferably about 6 to 13. Although gelation can occur at an acidic pH, lowering the initial pH of the solution below 7 does not favor gelation. The initial pH of the solution is most preferably alkaline, i.e., greater than 7 to about 13. Increasing the pH within the prescribed range increases the rate of gelation.

The polymer concentration in the solution is about 1000 ppm up to the solubility limit of the polymer in the solvent or the rheological constraints of the polymer solution, preferably about 1000 to about 200,000 ppm, and most preferably about 3000 to about 100,000. Increasing the polymer concentration increases the gelation rate and ultimate gel strength at a constant ratio of polymer to crosslinking agent.

The ionic strength of the solvent can be from that of deionized distilled water to that of a brine having an ion concentration approaching the solubility limit of the brine. Increasing the ionic strength of the solution can increase the gelation rate.

The weight ratio of acrylamide polymer to chromium III and carboxylate species comprising the mixture is about 1:1 to about 500:1, preferably about 2.5:1 to about 100:1, and most preferably about 5:1 to about 40:1. Decreasing the ratio generally increases the gelation rate and up to a certain point generally increases the gel strength, especially at a constant high polymer concentration.

The degree of hydrolysis is about 0 to 60% and preferably about 0 to 30%. Within the preferred range, increasing the degree of hydrolysis increases the gelation rate. Increasing the molecular weight of the polymer increases the gel strength.

It is apparent from these correlations that one can produce gels across a very broad range of gelation rates and gel properties as a function of the gelation conditions. Thus, to effect an optimum gelation treatment according to the present process, the practitioner predetermines the gelation rate and properties of the resultant gel which meet the treatment demands of the given region and thereafter produces the gel having these predetermined characteristics. The treatment demands include the in situ gelation conditions such as temperature, connate water properties, and permeability of the region as well as the post treatment conditions such as injection and production pressures. Analytical methods known to one skilled in the art are used to determine the treatment demands. The treatment demands provide criteria to predetermine the gelation rate and resultant gel properties in the manner described above and continuing hereafter.

The gelation rate is advantageously sufficiently slow to enable preparation of the gelation solution at the surface, injection of the solution as a uniform slug into the wellbore, and displacement of the entire solution into the desired treatment zone. Too rapid a gelation rate produces excessive gelation of the solution at the surface which results in a solution that may be difficult, if not impossible, to inject into the wellbore or formation due to its rheological properties. At the same time, the gelation rate must be sufficiently rapid to enable completion of the reaction within a reasonable period of time so that the well may be returned to injection or production after treatment.

When treating anomalies, at least partial gelation of the solution, if not complete gelation for some flowing gels, is advantageous before the solution reaches the face bounding the matrix and the anomaly to prevent the solution from penetrating the matrix as well as the anomaly. Substantial penetration of the matrix by the solution and the ensuing permeability reduction of the matrix are counterproductive to the plugging of anomalies. The values of the independent variables in the process are carefully selected to achieve a gelation rate meeting these criteria.

The volume of solution injection into the formation is a function of the volume and location of the desired treatment region and the degree of penetration into the treatment region by the solution. One skilled in the art can determine the required volume of gel for a given treatment region. Placement of the gelation solution in the treatment region may be facilitated by zone isolation means such as packers and the like.

The injection rate is a function of the gelation rate and operational constraints of injection pressure and pumping limits. The required injection rate is fixed such that all of the solution can be practically injected into the treatment zone before it becomes unpumpable. The gelation time of the gel ranges from near instantaneous for flowing gels up to 48 hours or longer for both flowing and non-flowing gels. Longer gelation times are limited by practical considerations of lost production when injection and production wells are shut in.

The process is applicable to conformance treatment of formations under most conditions and is specific to treating regions within the formation which are in fluid communication with an injection or production well. The flowing gel is especially applicable to the treatment of anomalies such as streaks of relatively high permeability, fractures or fracture networks in direct communication via the anomaly with an injection well but not also in direct communication via the anomaly with a production well. The ultimate gel is turned a flowing gel as defined herein because it would flow if unconfined on the surface. However, the flowing gel is sufficiently crosslinked to remain in place under injection conditions in the anomaly when confined thereby. Thus, the flowing gel is capable of effectively plugging the anomaly.

The flowing gel is not generally suitable for treatment of anomalies in direct communication via the anomaly with production wells because flowing gels do not have sufficient strength to withstand the drawdown pressure during production and may flow back into the wellbore. For treatment of anomalies in direct communication with production wells, non-flowing rigid gels having sufficient strength to withstand the production drawdown pressure are preferred. It is preferred that substantially none of the gel flows back into the wellbore when oil is produced after the conformance treatment.

In some specialized cases, the degree of partial gelation of the injected solution can be maintained sufficiently low to enable the solution to enter a selected high permeability zone of the matrix and crosslink to completion in situ as either a non-flowing gel or a flowing gel. Both flowing and non-flowing gels can be used for treatment of high permeability zones of the matrix because in general neither will flow from the treatment zone upon complete gelation, a necessary condition for the present invention. However, non-flowing gels are preferred for treatment of high permeability zones in direct communication with production wells because of their increased strength.

PA is preferred for the formulation of non-flowing gels because it has a slower gelation rate than PHPA which enables one to inject it into the treatment region before it sets up. PHPA is preferred for the formulation of flowing gels because in many cases flowing gels can be injected into a treatment region even when reacted to completion.

Gels having a predetermined gelation rate and resultant gel properties to meet the treatment demands of a given region are produced by adjusting and setting the surface gelation conditions as they correlate to the gelation rate and gel properties. Accordingly the gels are produced in a manner which renders them insensitive to most extreme formation conditions. The gels can be applied to the treatment of many different geological structures including high permeability zones within the formation matrix and anomalies external to the matrix such as fractures and other cavities. The gels can be stable at formation temperatures as high as 115° C. and at any formation pH contemplated. The gels are relatively insensitive to the stratigraphy of the rock and can be employed in carbonate and sandstone strata and unconsolidated or consolidated strata having varying mineralogy. Once the gels are in place, it is extremely difficult to displace the gels by physical or chemical means other than total destruction of the crosslinked network. The gels may be reversible on contact with hydrogen peroxide or sodium hypochlorite, but are substantially insoluble in the formation fluids.

The following examples demonstrate the practice and utility of the present invention but are not to be construed as limiting the scope thereof.

Most of the examples are formatted as tables of data which describe the formulation and maturation of one or more gels. Each gel is represented in a table by a single experimental run. Data include the conditions for producing the gel and the quantitative or qualitative strength of the produced gel. The tables display data in a three-tier format. The first tier is the values of the fixed gelation conditions which are constant and common to every run in the table. The second tier is values of the gelation conditions which vary among the different runs in the table but are constant for any given run. The third tier is the gel strength which varies as a function of time within each run. Qualitative gel strength is expressed in alphabetic code. Quantitative gel strength is simply the numerical value of apparent viscosity.

The following gel strength code and nomenclature are useful for interpreting the tables.

| Gel Strength Code | |
|---|---|
| A | No detectable gel formed: the gel appears to have the same viscosity as the original polymer solution. |
| B | Highly flowing gel: the gel appears to be only slightly more viscous than the initial polymer solution. |
| C | Flowing gel: most of the gel flows to the bottle cap by gravity upon inversion. |
| D | Moderately flowing gel: only a small portion (5-10%) of the gel does not readily flow to the bottle cap by gravity upon inversion (usually characterized as a tonguing gel). |
| E | Barely flowing gel: the gel can barely flow to the bottle cap and/or a significant portion (>15%) of the gel does not flow by gravity upon inversion. |
| F | Highly deformable nonflowing gel: the gel does not flow to the bottle cap by gravity upon inversion. |
| G | Moderately deformable nonflowing gel: the gel deforms about half way down the bottle by gravity upon inversion. |
| H | Slightly deformable nonflowing gel: only the gel surface slightly deforms by gravity upon inversion. |
| I | Rigid gel: there is no gel surface deformation by gravity upon inversion. |
| J | Ringing rigid gel: a tuning fork-like mechanical vibration can be felt upon tapping the bottle. |

| Nomenclature | |
|---|---|
| % Hydrolysis | % of carboxylate groups on the acrylamide polymer based on the total number of acrylamide groups |
| Polymer MW | average molecular weight of the acrylamide polymer |
| Polymer Conc | acrylamide polymer concentration in the polymer solution (ppm) |
| Polymer Solvent | aqueous solvent in the polymer solution |
| Polymer pH | pH of the polymer solution |
| Total Ion Conc | total concentration of chromium III and acetate ions in the gelation solution (ppm) |
| Weight Ratio Polymer:Ions | weight ratio of acrylamide polymer to chromium III and acetate ions in the gelation solution |
| Metal Ion Conc | chromium III ion concentration in the gelation solution |
| Temp | gelation temperature (°C.) |
| Time | gelation time (hr) |
| Gel Code | gel strength code |
| Viscosity | apparent viscosity of the gelation solution (cp) |
| Pressure | viscometer pressure (kPa) |

The polymer solutions of the following examples are prepared by dilution aqueous acrylamide polymer solutions with an aqueous solvent. Where qualitative data are obtained, the dilute polymer solution is combined with a crosslinking agent solution in a 0.12 liter wide-mouth bottle to form a 0.05 liter sample. The sample is gelled in the capped bottle and the qualitative gel strength is determined by periodically inverting the bottle.

Where quantitative data are obtained, the polymer solution and crosslinking agent solution are combined in a variable pressure and temperature rheometer (viscometer), having an oscillatory mode of 0.1 rad/sec and 100% strain. The apparent viscosity at a shear rate of 0.1 sec$^{-1}$ is recorded as a function of time.

In all of the examples, the crosslinking agent solution is that used in the present invention (i.e., a complex or mixture of complexes comprised of chromium III and acetate ions) unless the example is comparative and specifically describes a crosslinking agent solution different from that of the present invention. The crosslinking agent solution of the present invention is prepared by dissolving solid $CrAc_3.H_2O$ or $CrAc_7(OH)_2$ in water or diluting a solution obtained commercially under the label of "Chromic Acetate 50% Solution". In some examples, the actual method of preparing the crosslinking agent solution is specified.

EXAMPLE 1

| % Hydrolysis: | 30 |
|---|---|
| Polymer MW: | 5,000,000 |
| Polymer Conc: | 8350 |
| Polymer Solvent: | 5,000 ppm NaCl in aqueous solution |
| Polymer pH: | 10.6 |

| Run Number | 1 | 2 | 3 | 4 | 5 | 6 | 7 | 8 | 9 |
|---|---|---|---|---|---|---|---|---|---|
| Metal Ion Conc | 52 | 105 | 210 | 420 | 630 | 105 | 210 | 420 | 630 |
| Total Ion Conc | 250 | 500 | 1000 | 2000 | 3000 | 500 | 1000 | 2000 | 3000 |
| Weight Ratio Polymer:Ions | 33 | 16.7 | 8.4 | 4.2 | 2.8 | 16.7 | 8.4 | 4.2 | 2.8 |
| Temp | rt* | rt | rt | rt | rt | 60 | 60 | 60 | 60 |

| Time | Gel Code | | | | | | | | |
|---|---|---|---|---|---|---|---|---|---|
| 0.5 | A | A | A | A | A | B | B | C | C |
| 1.0 | A | A | A | A | A | C | C | D | E |
| 1.5 | A | A | A | A | A | D | E | G | H |
| 2.0 | B | B | B | B | B | E | F | H | I |
| 4.0 | B | B | B | C | D | G | G | H | I |
| 8.0 | B | B | C | D | E | G | H | I | J |
| 24 | D | E | E | F | H | G | H | I | J |
| 48 | E | E | E | G | I | G | H | I | J |
| 80 | G | G | G | H | I | G | H | I | J |
| 168 | G | G | H | I | J | G | I | J | J |
| 2040 | G | G | H | I | J | G | I | J | J |

*room temperature

The data show that gelation rate and gel strength increase as the temperature increases and as the weight ratio of polymer to ions decreases.

EXAMPLE 2

| % Hydrolysis: | 30 |
|---|---|
| Polymer MW: | 5,000,000 |
| Polymer Conc: | 8350 |
| Polymer Solvent: | 5,000 ppm NaCl in aqueous solution |
| Temp: | rt |

| Run Number | 1 | 2 | 3 | 4 | 5 | 6 | 7 |
|---|---|---|---|---|---|---|---|
| Polymer pH | 10.6 | 10.6 | 10.6 | 10.6 | 8.0 | 8.0 | 8.0 |
| Metal Ion Conc | 105 | 210 | 420 | 630 | 105 | 210 | 420 |
| Total Ion Conc | 500 | 1000 | 2000 | 3000 | 500 | 1000 | 2000 |
| Weight Ratio Polymer:Ions | 16.7 | 8.4 | 4.2 | 2.8 | 16.7 | 8.4 | 4.2 |

| Time | Gel Code | | | | | | |
|---|---|---|---|---|---|---|---|
| 0.5 | A | A | A | A | A | A | A |
| 1.0 | A | A | A | A | A | A | A |
| 1.5 | A | A | A | A | A | A | A |
| 2.0 | B | B | B | B | A | A | A |
| 2.5 | B | B | B | B | A | A | A |
| 4.0 | B | B | C | D | A | B | B |
| 5.0 | B | C | D | D | A | B | B |
| 6.0 | B | C | D | E | A | B | B |
| 7.0 | B | C | D | E | A | B | B |
| 8.0 | B | C | D | E | B | B | B |
| 24 | E | E | F | G | B | B | B |
| 28 | E | E | G | I | B | B | B |
| 48 | E | E | G | I | B | B | B |
| 80 | G | G | H | I | B | C | C |
| 168 | G | H | I | J | C | E | G |
| 2040 | G | H | I | J | E | E | G |

| Run Number | 8 | 9 | 10 | 11 | 12 | 13 | 14 |
|---|---|---|---|---|---|---|---|
| Polymer pH | 8.0 | 7.0 | 7.0 | 7.0 | 7.0 | 6.0 | 6.0 |
| Metal Ion Conc | 630 | 105 | 210 | 420 | 630 | 105 | 210 |
| Total Ion Conc | 3000 | 500 | 1000 | 2000 | 3000 | 500 | 1000 |
| Weight Ratio Polymer:Ions | 2.8 | 16.7 | 8.4 | 4.2 | 2.8 | 16.7 | 8.4 |

| Time | Gel Code | | | | | | |
|---|---|---|---|---|---|---|---|
| 0.5 | A | A | A | A | A | A | A |
| 1.0 | A | A | A | A | A | A | A |
| 1.5 | A | A | A | A | A | A | A |
| 2.0 | A | A | A | A | A | A | A |
| 2.5 | A | A | A | A | A | A | A |
| 4.0 | B | A | A | A | A | A | A |
| 5.0 | B | A | A | B | B | A | A |
| 6.0 | B | A | B | B | B | A | A |
| 7.0 | B | A | B | B | B | A | B |
| 8.0 | B | B | B | B | B | B | B |
| 24 | C | B | C | C | C | B | B |
| 28 | C | B | C | D | E | B | C |
| 48 | C | B | C | D | E | B | C |
| 80 | G | B | C | D | E | B | C |
| 168 | H | B | D | E | H | D | D |
| 2040 | — | E | F | G | — | E | F |

| Run Number | 15 | 16 | 17 | 18 | 19 | 20 |
|---|---|---|---|---|---|---|
| Polymer pH | 6.0 | 6.0 | 4.0 | 4.0 | 4.0 | 4.0 |
| Metal Ion Conc | 420 | 630 | 105 | 210 | 420 | 630 |
| Total Ion Conc | 2000 | 3000 | 500 | 1000 | 2000 | 3000 |
| Weight Ratio Polymer:Ions | 4.2 | 2.8 | 16.7 | 8.4 | 4.2 | 2.8 |

| Time | Gel Code | | | | | |
|---|---|---|---|---|---|---|
| 0.5 | A | A | A | A | A | A |
| 1.0 | A | A | A | A | A | A |
| 1.5 | A | A | A | A | A | A |
| 2.0 | A | B | A | A | A | B |
| 2.5 | A | A | A | A | A | B |
| 4.0 | B | B | A | A | A | B |
| 5.0 | B | B | A | A | B | B |
| 6.0 | B | B | A | A | B | C |
| 7.0 | B | B | A | A | B | C |
| 8.0 | B | B | A | B | B | C |
| 24 | C | C | B | C | D | D |
| 28 | D | F | B | C | D | D |
| 48 | D | F | B | C | D | E |
| 80 | D | F | B | C | F | G |
| 168 | E | G | B | D | G | I |
| 2040 | G | — | D | G | — | — |

The data show that gelation rate and gel strength decrease as pH of the polymer solution decreases.

EXAMPLE 3

| % Hydrolysis: | <1 |
| --- | --- |
| Polymer MW: | 11,000,000 |
| Polymer Conc: | 20,000 |
| Polymer Solvent: | Denver Tap Water |
| Temp: | 60 |

| Run Number: | 1 | 2 | 3 |
| --- | --- | --- | --- |
| Weight Ratio Polymer:Ions | 40 | 20 | 10 |

| Time | Viscosity | | |
| --- | --- | --- | --- |
| 0.0 | 940,000 | 940,000 | 940,000 |
| 0.5 | 500,000 | 1,300,000 | 1,300,000 |
| 1.0 | 800,000 | 2,300,000 | 2,300,000 |
| 2.0 | 1,100,000 | 2,800,000 | 3,500,000 |
| 4.0 | 1,200,000 | 3,200,000 | 4,300,000 |
| 8.0 | 1,300,000 | 3,400,000 | 4,700,000 |
| 12 | 1,300,000 | 3,400,000 | 4,700,000 |
| 16 | 1,400,000 | 3,400,000 | 4,700,000 |
| 20 | 1,400,000 | 3,400,000 | 4,700,000 |

Viscosity data confirm the observations of Examples 1 and 2 that decreasing the weight ratio of polymer to ions increases the gelation rate.

EXAMPLE 4

| % Hydrolysis: | <1 |
| --- | --- |
| Polymer MW: | 11,000,000 |
| Polymer Conc: | 20,000 |
| Polymer Solvent: | Denver Tap Water |
| Weight Ratio Polymer:Ions: | 20 |

| Run Number | 1 | 2 | 3 |
| --- | --- | --- | --- |
| Temp | 23 | 43 | 60 |

| Time | Viscosity | | |
| --- | --- | --- | --- |
| 0.0 | 50,000 | 50,000 | 50,000 |
| 0.2 | 50,000 | 50,000 | 875,000 |
| 0.5 | 50,000 | 100,000 | 1,400,000 |
| 1.0 | 60,000 | 200,000 | 2,250,000 |
| 2.0 | 75,000 | 600,000 | 2,900,000 |
| 4.0 | 100,000 | 1,125,000 | 3,275,000 |
| 8.0 | 125,000 | 1,800,000 | 3,400,000 |
| 12 | 175,000 | 2,100,000 | 3,425,000 |
| 16 | 200,000 | 2,300,000 | 3,425,000 |
| 20 | 300,000 | 2,500,000 | 3,425,000 |

Viscosity data confirm that increasing the temperature increases the gelation rate.

EXAMPLE 5

| % Hydrolysis: | <1 |
| --- | --- |
| Polymer MW: | 11,000,000 |
| Polymer Conc: | 20,000 |
| Polymer Solvent: | Denver Tap Water |
| Weight Ratio Polymer:Ions: | 20 |
| Temp: | 60 |

| Run Number: | 1 | 2 | 3 |
| --- | --- | --- | --- |
| Pressure | 690 | 3450 | 6900 |

| Time | Viscosity | | |
| --- | --- | --- | --- |
| 0.0 | 91,000 | 91,000 | 91,000 |
| 0.2 | 250,000 | 800,000 | 250,000 |
| 0.5 | 800,000 | 1,400,000 | 800,000 |
| 1.0 | 1,700,000 | 2,200,000 | 2,000,000 |
| 2.0 | 2,300,000 | 2,800,000 | 2,700,000 |
| 3.0 | 2,500,000 | 3,200,000 | 3,200,000 |
| 4.0 | 2,700,000 | 3,300,000 | 3,400,000 |
| 8.0 | 2,750,000 | 3,400,000 | 3,500,000 |
| 12 | 2,800,000 | 3,400,000 | 3,500,000 |
| 16 | 2,800,000 | 3,400,000 | 3,500,000 |
| 20 | 2,800,000 | 3,400,000 | 3,500,000 |

Viscosity data show that gelation rate is a weak function of pressure. The rate increases slightly with pressure.

EXAMPLE 6

| Polymer MW: | 5,000,000 |
| --- | --- |
| Polymer Conc: | 10,000 |
| Polymer Solvent: | Denver Tap Water |
| Polymer pH: | 8.0 |
| Temp: | rt |
| Metal Ion Conc: | 207 |
| Total Ion Conc: | 990 |
| Weight Ratio Polymer:Ions: | 10.0 |

| Run Number | 1 | 2 |
| --- | --- | --- |
| % Hydrolysis | 30 | <1 |

| Time | Gel Code | |
| --- | --- | --- |
| 0.25 | B | A |
| 2.0 | B | A |
| 3.0 | C | A |
| 4.0 | C | A |
| 5.0 | C | B |
| 8.0 | E | B |
| 23 | F | B |
| 48 | E | B |
| 72 | F | B |
| 103 | F | B |
| 268 | G | B |

The data show that the rate of gelation of partially hydrolyzed polyacrylamide is considerably faster than that of substantially unhydrolyzed polyacrylamide. Thus, the gelation rate of an acrylamide polymer solution can be slowed by reducing the degree of hydrolysis of the acrylamide groups.

EXAMPLE 7

| Polymer MW: | 11,000,000 |
| --- | --- |
| Polymer Conc: | 12,500 |
| Polymer Solvent: | Denver Tap Water |
| Temp: | 40 |
| Weight Ratio Polymer:Ions: | 20 |
| Pressure: | 3450 |

| Run Number | 1 | 2 |
| --- | --- | --- |
| % Hydrolysis | 30 | <1 |
| Polymer pH | 10 | 9 |

| Time | Viscosity | |
| --- | --- | --- |
| 0 | 190,000 | 8,000 |
| 0.1 | 255,000 | 10,000 |
| 0.5 | 300,000 | 15,000 |
| 1 | 350,000 | 25,000 |
| 2 | 415,000 | 40,000 |
| 3 | 460,000 | 70,000 |
| 4 | 500,000 | 100,000 |
| 8 | 575,000 | 210,000 |
| 11 | 600,000 | 300,000 |
| 14 | 605,000 | 355,000 |
| 18 | 605,000 | 425,000 |
| 20 | 605,000 | 460,000 |
| 36 | 605,000 | 610,000 |

Viscosity data confirm the observations of Example 6.

EXAMPLE 8

| % Hydrolysis: | <1 |
| --- | --- |
| Polymer MW: | 5,000,000 |
| Polymer Conc: | 20,000 |
| Polymer Solvent: | Denver Tap Water |
| Polymer pH: | 8.8 |

| Run Number | 1 | 2 | 3 | 4 | 5 | 6 | 7 | 8 |
| --- | --- | --- | --- | --- | --- | --- | --- | --- |
| Metal Ion Conc | 404 | 206 | 104 | 52.2 | 404 | 206 | 104 | 52.2 |
| Total Ion Conc | 1420 | 980 | 495 | 244 | 1920 | 980 | 495 | 249 |
| Weight Ratio Polymer:Ions | 10 | 20 | 40 | 80 | 10 | 20 | 40 | 80 |
| Temp | rt | rt | rt | rt | 60 | 60 | 60 | 60 |
| Time | | | | Gel Code | | | | |
| 0.5 | A | A | A | A | B | B | A | A |
| 1.0 | A | A | B | B | G | G | F | C |
| 2.0 | A | A | B | B | I | I | I | I |
| 3.0 | B | B | B | B | J | J | J | J |
| 5.0 | B | B | B | B | J | J | J | J |
| 6.0 | C | C | C | C | J | J | J | J |
| 7.0 | E | E | E | E | J | J | J | J |
| 8.0 | G | G | F | F | J | J | J | J |
| 25 | H | H | H | H | J | J | J | J |
| 48 | H | H | H | H | J | J | J | J |
| 96 | I | I | I | I | J | J | J | J |
| 120 | I | I | I | I | J | J | J | J |
| 144 | J | J | J | J | J | J | J | J |
| 1032 | J | J | J | J | J | — | — | — |

The data show that there is a functional relation between gelation rate and temperature for polyacrylamide gels as well as partially hydrolyzed polyacrylamide gels.

EXAMPLE 9

| % Hydrolysis: | 30 |
| --- | --- |
| Polymer MW: | 5,000,000 |
| Polymer Solvent: | Distilled Water |
| Polymer pH: | 8.0 |
| Temp: | rt |
| Weight Ratio Polymer:Ions: | 10 |

| Run Number | 1 | 2 | 3 | 4 | 5 | 6 |
| --- | --- | --- | --- | --- | --- | --- |
| Metal Ion Conc | 310 | 207 | 157 | 105 | 63 | 42 |
| Total Ion Conc | 1,480 | 990 | 747 | 499 | 300 | 200 |
| Polymer Conc | 15,000 | 10,000 | 7,500 | 5,000 | 3,000 | 2,000 |
| Time | | | Gel Code | | | |
| 0.25 | B | B | B | A | A | A |
| 0.5 | C | B | B | A | A | A |
| 1.0 | C | B | B | A | A | A |
| 2.0 | E | B | B | A | A | A |
| 3.0 | E | C | B | A | A | A |
| 4.0 | G | C | B | A | A | A |
| 5.0 | I | C | B | B | A | A |
| 8.0 | I | E | C | B | B | A |
| 23 | I | F | C | B | B | A |
| 48 | I | F | C | C | B | A |
| 72 | I | G | D | C | B | A |
| 103 | I | G | F | C | B | B |
| 268 | I | H | F | D | C | B |

The data show that decreasing the polymer concentration while maintaining the same weight ratio of polymer to ions substantially decreases the gelation rate and gel strength, enabling one to produce a flowing gel.

EXAMPLE 10

| % Hydrolysis: | <1 |
| --- | --- |
| Polymer Solvent: | Denver Tap Water |
| Weight Ratio Polymer:Ions: | 10 |
| Temp: | 60 |

| Run Number | 1 | 2 | 3 |
| --- | --- | --- | --- |
| Polymer Conc | 30,000 | 20,000 | 15,000 |
| Time | | Viscosity | |
| 0.0 | 3,000 | 3,000 | 3,000 |
| 0.2 | 700,000 | 700,000 | 200,000 |
| 0.5 | 1,700,000 | 1,600,000 | 400,000 |
| 1.0 | 3,200,000 | 2,300,000 | 800,000 |
| 2.0 | 4,000,000 | 2,800,000 | 1,000,000 |
| 4.0 | 4,600,000 | 3,300,000 | 1,200,000 |
| 8.0 | 4,600,000 | 3,300,000 | 1,200,000 |
| 20 | 4,600,000 | 3,300,000 | 1,200,000 |

Viscosity data confirm the observations of Example 9 that gelation rate decreases as polymer concentration decreases.

EXAMPLE 11

| % Hydrolysis: | 30 |
| --- | --- |
| Polymer Conc: | 3,000 |
| Polymer Solvent: | 3,000 ppm NaCl in aqueous solution |
| Polymer pH: | 10.1 |
| Temp: | rt |
| Metal Ion Conc: | 155 |
| Total Ion Conc: | 600 |
| Weight Ratio Polymer:Ions: | 5.0 |

| Run Number | 1 | 2 |
| --- | --- | --- |
| Polymer MW | 5,000,000 | 11,000,000 |
| Time | Gel Code | |
| 0.5 | A | A |
| 1.0 | A | B |
| 3.0 | A | B |
| 4.0 | B | C |
| 5.0 | B | E |
| 11 | B | E |
| 24 | C | F |
| 48 | C | G |
| 56 | D | G |
| 101 | D | G |
| 156 | E | G |
| 192 | E | G |
| 269 | F | G |

The data show that gelation rate and gel strength increase as the molecular weight of the polymer increases.

EXAMPLE 12

| % Hydrolysis: | <1 |
| --- | --- |
| Polymer Conc: | 20,000 |
| Polymer Solvent: | Denver Tap Water |
| Weight Ratio Polymer:Ions: | 20 |
| Temp: | 60 |

| Run Number | 1 | 2 |
| --- | --- | --- |
| Polymer MW | 5,000,000 | 11,000,000 |
| Time | Viscosity | |
| 0.0 | 100,000 | 100,000 |
| 0.5 | 300,000 | 1,400,000 |
| 1.0 | 800,000 | 2,200,000 |
| 2.0 | 1,300,000 | 2,800,000 |
| 4.0 | 1,800,000 | 3,200,000 |
| 6.0 | 2,000,000 | 3,300,000 |
| 8.0 | 2,100,000 | 3,400,000 |
| 12 | 2,200,000 | 3,400,000 |
| 16 | 2,200,000 | 3,400,000 |

Viscosity data confirm the observations of Example 11.

Examples 1–12 show that the gelation rate of the polymer and crosslinking agent of the present invention can be adjusted to any desired rate and gel strength by selecting the values of the independent variables such as polymer or crosslinking agent concentration, polymer molecular weight, temperature, pH, etc. This is particularly useful in customizing a gel for a specific application.

Various salts and gases commonly found in oil field brines are added to the gelation solution of Examples 13 and 14 to determine the sensitivity of the gelation reaction to in situ fluids.

EXAMPLE 13

| % Hydrolysis: | 30 |
| --- | --- |
| Polymer MW: | 5,000,000 |
| Polymer Conc: | 8350 |
| Polymer pH: | 9.6 |
| Temp: | rt |
| Metal Ion Conc: | 259 |
| Total Ion Conc: | 1,000 |
| Weight Ratio Polymer:Ions: | 8.4 |

| Run Number | 1 | 2 | 3 | 4 |
| --- | --- | --- | --- | --- |
| Polymer Solvent | fresh water | 3,000 ppm NaCl | 10,000 ppm NaCl | 29,200 ppm NaCl |

| Time | Gel Code | | | |
| --- | --- | --- | --- | --- |
| 0.5 | B | B | B | B |
| 1.0 | B | C | D | D |
| 2.0 | B | C | D | D |
| 3.0 | B | D | D | D |
| 4.0 | B | D | D | D |
| 5.0 | B | E | E | E |
| 7.0 | B | E | E | E |
| 24 | D | F | F | F |
| 51 | G | G | G | G |
| 79 | I | I | I | I |
| 480 | I | I | I | I |

EXAMPLE 14

| % Hydrolysis: | 30 |
| --- | --- |
| Polymer MW: | 5,000,000 |
| Polymer Conc: | 8350 ppm |
| Polymer Solvent: | 5,000 ppm NaCl in aqueous solution |
| Polymer pH: | 7.0 |
| Temp: | rt |
| Metal Ion Conc: | 259 |
| Total Ion Conc: | 1000 |
| Weight Ratio Polymer:Ions: | 8.4 |

| Run Number | 1 | 2 | 3 | 4 | 5 |
| --- | --- | --- | --- | --- | --- |
| Additive: | none (control) | $CO_2$ | $NaNO_3$ | $MgCl_2$ | $CaCl_2$ |
| Additive Conc (ppm): | — | saturated solution | 2000 | 2000 | 1000 |

| Time | Gel Code | | | | |
| --- | --- | --- | --- | --- | --- |
| 1.0 | A | A | A | A | A |
| 4.0 | A | A | A | A | A |
| 5.0 | B | B | B | B | B |
| 6.0 | B | B | B | B | B |
| 7.0 | B | B | B | B | B |
| 8.0 | C | C | C | C | C |
| 24 | C | C | C | C | C |
| 72 | D | D | C | D | D |
| 120 | E | E | E | E | E |
| 264 | E | E | E | E | F |
| 288 | E | E | E | E | F |
| 408 | E | E | E | E | F |

| Run Number | 6 | 7 | 8 | 9 | 10 |
| --- | --- | --- | --- | --- | --- |
| Additive: | $Na_2SO_4$ | $NH_4Cl$ | KCl | $NaHCO_3$ | $Na_2CO_3$ |
| Additive Conc (ppm): | 3,000 | 100 | 400 | 2000 | 100 |

| Time | Gel Code | | | | |
| --- | --- | --- | --- | --- | --- |
| 1.0 | A | A | A | A | A |
| 4.0 | A | A | A | A | A |
| 5.0 | B | B | B | B | B |
| 6.0 | B | B | B | B | B |
| 7.0 | B | B | C | B | B |
| 8.0 | C | C | C | B | B |
| 24 | C | C | C | C | C |
| 72 | D | D | D | D | D |
| 120 | E | D | D | E | E |
| 264 | F | F | F | F | F |
| 288 | F | F | F | F | F |
| 408 | F | F | F | F | F |

The data of Examples 13 and 14 show that the gelation reaction is relatively insensitive to these additives.

Examples 15-17 utilize actual or synthetic field injection waters in the gelation solutions.

EXAMPLE 15

| % Hydrolysis: | 30 |
| --- | --- |
| Polymer MW: | 11,000,000 |
| Polymer Conc: | 3000 |
| Polymer Solvent: | Synthetic Field Injection Water A* |
| Polymer pH: | 10.4 |
| Metal Ion Conc: | 77.5 |
| Total Ion Conc: | 299 |
| Weight Ratio Polymer:Ions: | 10.0 |

| Run Number | 1 | 2 |
| --- | --- | --- |
| Temp | rt | 43** |

| Time | Gel Code | |
| --- | --- | --- |
| 0.50 | B | B |
| 0.75 | C | C |
| 1.0 | C | D |
| 1.5 | C | D |
| 2.0 | D | E |
| 6.0 | D | E |
| 8.0 | E | E |
| 35 | F | F |
| 168 | F | F |
| 240 | G | F |
| 269 | G | G |
| 504 | G | G |

*Synthetic Field Injection Water A has the following composition:

| | g/l |
| --- | --- |
| $CaSO_4.H_2O$ | 0.594 |
| $MgSO_4$ | 0.788 |
| $NaHCO_3$ | 1.53 |
| $CaCl_3$ | 0.655 |
| $Na_2SO_4$ | 1.52 |
| $K_2SO_4$ | 0.452 |

**Temperature of Field A.

EXAMPLE 16

| % Hydrolysis: | 30 |
| --- | --- |
| Polymer MW: | 5,000,000 |
| Polymer Solvent: | Actual Field Injection Water B* |
| Temp: | 60** |

| Run Number | 1 | 2 | 3 | 4 |
| --- | --- | --- | --- | --- |
| Polymer Conc | 3000 | 4000 | 5000 | 8000 |
| Polymer pH | 8.5 | 8.5 | 8.5 | 9.0 |
| Metal Ion Conc | 54.5 | 72.6 | 64.9 | 90.7 |
| Total Ion Conc | 240 | 320 | 286 | 399 |
| Weight Ratio Polymer:Ions | 12.5 | 12.5 | 17.5 | 20 |

| Time | Gel Code | | | |
| --- | --- | --- | --- | --- |
| 0.5 | A | A | A | A |
| 1.0 | A | A | A | C |
| 1.5 | A | B | B | D |
| 2.0 | B | D | D | E |
| 3.0 | C | D | D | F |
| 4.0 | D | D | D | F |

-continued

| | | | | |
|---|---|---|---|---|
| 5.0 | D | E | E | F |
| 12 | D | E | E | F |
| 27 | D | D | D | F |
| 504 | D | D | D | F |

*Actual Field Injection Water B has a TDS of 0.58%, $H_2S$ > 100 ppm, and is comprised of the following primary ionic constituents:

| | ppm |
|---|---|
| $Na^+$ | 252 |
| $Mg^{2+}$ | 97 |
| $Ca^{2+}$ | 501 |
| $Cl^-$ | 237 |
| $SO_4^{2-}$ | 1500 |
| $HCO_3^-$ | 325 |

**Temperature of Field B.

EXAMPLE 17

| | |
|---|---|
| % Hydrolysis: | 30 |
| Polymer Solvent: | Synthetic Field Injection Water C* |
| Polymer pH: | 7.5 |
| Temp: | rt** |
| Weight Ratio Polymer:Ions: | 15 |

| Run Number | 1 | 2 | 3 |
|---|---|---|---|
| Polymer MW | 11,000,000 | 11,000,000 | 11,000,000 |
| Polymer Conc | 3,000 | 5,000 | 8,000 |
| Metal Ion Conc | 45.4 | 75.7 | 121 |
| Total Ion Conc | 200 | 333 | 533 |

| Time | | Gel Code | |
|---|---|---|---|
| 0.25 | A | A | A |
| 0.5 | A | A | B |
| 4.0 | A | A | B |
| 5.0 | A | A | C |
| 6.0 | A | B | C |
| 7.0 | A | C | D |
| 24 | B | D | D |
| 96 | C | D | G |
| 150 | D | D | G |
| 197 | D | D | H |
| 936 | D | D | H |

*Synthetic Field Injection Water C has the following composition:

| | g/l |
|---|---|
| $Na_2CO_3$ | 0.249 |
| $NH_4Cl$ | 0.085 |
| $CaCl_2$ | 0.821 |
| $MgCl_2.6H_2O$ | 1.78 |
| $Na_2SO_4$ | 1.09 |
| NaCl | 4.80 |
| $NaHCO_3$ | 2.09 |

**Temperature of Field C.

Examples 15–17 show that gels can be formulated in saline actual field waters. The concentration and proportions of gel components can be selected to form stable flowing or non-flowing gels even in a complex injection waters such as B and C at the formation temperature.

In Example 18–20, the gelation solutions are physically modified during aging.

EXAMPLE 18

| | |
|---|---|
| % Hydrolysis: | 30 |
| Polymer MW: | 5,000,000 |
| Polymer Conc: | 5,000 |
| Polymer Solvent: | 3,000 ppm NaCl in aqueous solution |
| Polymer pH: | 10.2 |
| Temp: | rt |
| Metal Ion Conc: | 155 |
| Total Ion Conc: | 600 |
| Weight Ratio Polymer:Ions: | 8.3 |

| Run Number | 1 | 2 | 3 |
|---|---|---|---|

-continued

| Time | | Gel Code | |
|---|---|---|---|
| 1.0 | A | A | A |
| 1.5 | B | B | B |
| 4.0 | D | D | D |
| 17 | E | E | E |
| 24 | E | E | E |
| 96 | E | E | E |

| | | Viscosity | |
|---|---|---|---|
| 96 | 1400 | 2000 | 2300 |

The gel of Run 1 is aged without agitation. The gel of Run 2 is stirred after 1 hour of aging for 5 minutes at 1750 rpm with a 4 mm propeller in a 6 mm inside diameter bottle. The gel of Run 3 after 1 hour of aging is forced through a 10 cm long nylon tube 0.16 cm in diameter at a rate of 100 cc in 7.2 sec. and a pressure drop of 410 kPa.

Example 18 shows that shearing the gelation solution after 1 hour of aging has very little negative impact on the strength of the final gel. This is an important property because for many treatments such as treatment of fractured injection wells, the gelation solution will encounter the maximum shear forces when it leaves the wellbore and enters the formation, i.e., approximately 1 hour after injection. Yet, the sheared solution matures to approximately the same final gel strength as the unsheared solution.

EXAMPLE 19

| | |
|---|---|
| % Hydrolysis: | 30 |
| Polymer MW: | 5,000,000 |
| Polymer Conc: | 5000 |
| Polymer Solvent: | 3000 ppm NaCl |
| Polymer pH: | 10.2 |
| Temp: | rt |
| Metal Ion Conc: | 155 |
| Total Ion Conc: | 600 |
| Weight Ratio Polymer:Ions: | 8.3 |

| Run Number | 1 |
|---|---|
| Time | Gel Code |
| 0.50 | A |
| 1.0 | A |
| 1.5 | A |
| 2.0 | A |
| 3.5 | B |
| 4.0 | B |
| 5.0 | B |
| 6.0 | B |
| 7.0 | C |
| 23.5 | D |
| 24.0 | D |
| 26.0 | D |
| 31.0 | E |
| 94 | F |
| 240 | F |

The 50 cc gelation solution is filtered through an 8 micron millipore cellulose-acetate filter at a filtration pressure of 345 kPa after 1 hour of aging. The diameter of the filter is 47 mm. Although the solution has no visually detectable gel formation, only 0.8 cc of the solution pass through the filter after 10 minutes. In comparison, a of polymer solution absent the crosslinking agent is filtered according to the same procedure and the 50 cc sample passes through the filter in 2.6 minutes.

The experiment shows that the gelation solution containing crosslinking agent is sufficiently crosslinked to render it unfilterable. A gel that cannot pass through an 8 micron filter would not be expected to enter a competent formation matrix having a permeability below 1,000 md. Nonetheless, the gelation solution is highly pumpable after 1 hour of aging and capable of entering high permeability anomalies. Thus, the present gel is particularly suited for treatment of a fractured injection well. The gel enters fractures and reduces their fracture flow capacity, but does not enter the matrix and reduce matrix permeability. A further advantage of the present gel is that the greatest shear forces are usually encountered when the gelation solution leaves the wellbore and enters the formation, i.e., after 1 hour. Since the gel is immature at this point, i.e., highly pumpable, it suffers little shear degradation.

EXAMPLE 20

| % Hydrolysis: | 30 | | | | | |
|---|---|---|---|---|---|---|
| Polymer MW: | 11,000,000 | | | | | |
| Polymer Conc: | 5,000 | | | | | |
| Polymer Solvent: | Synthetic field injection water A* | | | | | |
| Polymer pH: | 7.5 | | | | | |
| Run Number | 1 | 2 | 3 | 4 | 5 | 6 |
| Metal Ion Conc: | 214 | 143 | 107 | 214 | 143 | 107 |
| Total Ion Conc: | 826 | 552 | 415 | 826 | 552 | 415 |
| Weight Ratio Polymer:Ions: | 6.0 | 9.0 | 12.0 | 6.0 | 9.0 | 12.0 |
| Temp: | rt | rt | rt | 43 | 43 | 43 |

*See Example 15 for composition.

The gelation solution is aged in a graduated cylinder for 48 hours. 50 additional milliliters of the PHPA solvent are added on top of the gel. The change in the position of the interface between the gel and the solvent in the graduated cylinder is recorded as a function of time.

| Run Number | 1 | 2 | 3 | 4 | 5 | 6 |
|---|---|---|---|---|---|---|
| Time | Change in Position of Interface (ml) | | | | | |
| 0.0 | 0 | 0 | 0 | 0 | 0 | 0 |
| 8.0 | 0 | 0 | +0.5 | 0 | 0 | +1 |
| 28 | 0 | 0 | 0 | 0 | 0 | 0 |
| 264 | 0 | 0 | +0.5 | 0 | 0 | 0 |
| 528 | +2.0 | +2.5 | +2.5 | +2 | 0 | −1 |

The gel of the present invention appears substantially resistant to water expulsion (syneresis) or swelling upon contact with additional formation water.

Examples 21-29 show comparative gelation data of gelation solutions containing polymer crosslinking agents known in the art.

EXAMPLE 21

A gelation solution #1 is prepared with the crosslinking agent of the present invention.

| Solution #1 | |
|---|---|
| % Hydrolysis: | 30 |
| Polymer MW: | 5,000,000 |
| Polymer Conc: | 2500 |
| Polymer Solvent: | Actual Field Injection Water B* |
| Weight Ratio Polymer:Ions: | 12.5:1** |

*See Example 16 for composition.
**The weight ratio selected for each solution is optimized for the solvent.

A gelation solution #2 is prepared with a chromium VI/redox crosslinking agent used in commercial treatments.

| Solution #2 | |
|---|---|
| % Hydrolysis: | 30 |
| Polymer MW: | 5,000,000 |
| Polymer Conc: | 3500 |
| Polymer Solvent: | Actual Field Injection Water B* |
| Weight Ratio Polymer:Ions: | 30:1** |

*See Example 16 for composition.
**The weight ratio selected for each solution is optimized for the solvent.

Both solutions are subjected to high shear rates and then returned to low shear rates. The result is a thixotropic loop shown in tabular form below.

| Solution Number | 1 | 2 |
|---|---|---|
| Shear Rate (sec$^{-1}$) | Viscosity | Viscosity |
| 5 | 5250 | 1800 |
| 10 | 3750 | 1400 |
| 20 | 1900 | 800 |
| 40 | 1200 | 500 |
| 60 | 900 | 400 |
| 80 | 800 | 300 |
| 100 | 600 | 200 |
| 80 | 800 | 200 |
| 60 | 900 | 200 |
| 40 | 1000 | 200 |
| 20 | 1400 | 200 |
| 10 | 2000 | 200 |
| 5 | 3100 | 200 |

*See Example 16 for composition.
**The weight ratio selected for each solution is optimized for the solvent.

The gel of the present invention (solution #1) demonstrates an ability to partially reheal after returning to a low shear rate. The gel of solution #2 is totally non-rehealing, i.e., the viscosity of final sheared solution #2 is similar to an uncrosslinked polymer solution of the same concentration.

EXAMPLE 22

The crosslinking agent of the present example is a 5% by wt. aluminum acetate solution.

| % Hydrolysis: | 30 | | |
|---|---|---|---|
| Polymer MW: | 5,000,000 | | |
| Polymer Conc: | 8400 | | |
| Polymer Solvent: | 5,000 ppm NaCl in aqueous solution | | |
| Polymer pH: | 7.0 | | |
| Temp: | rt | | |
| Run Number | 1 | 2 | 3 |
| Total Conc of Aluminum III and Acetate Ions in Gelation Solution (ppm) | 5000 | 250 | 100 |
| Weight Ratio of Polymer to Aluminum III and Acetate Ions in Gelation Solution | 1.7 | 34 | 84 |

Local gel balls form immediately in all three samples upon addition of the crosslinking agent solution to the polymer solution. However, a continuous gel does not form in any of the samples, even upon prolonged standing.

The crosslinking agent of Examples 23-28 is a 25% by wt. aluminum citrate solution.

EXAMPLE 23

| % Hydrolysis: | 30 |
| --- | --- |
| Polymer MW: | 5,000,000 |
| Polymer Conc: | 8350 |
| Polymer Solvent: | 5,000 ppm NaCl in aqueous solution |
| Polymer pH: | 7.0 |
| Temp: | rt |
| Metal Ion: | Aluminum III |
| Total Ions: | Aluminum III and Citrate |

| Run Number | 1 | 2 | 3 | 4 | 5 | 6 | 7 |
| --- | --- | --- | --- | --- | --- | --- | --- |
| Metal Ion Conc | 12.5 | 31.25 | 62.5 | 125 | 250 | 500 | 1000 |
| Total Ion Conc | 100 | 250 | 500 | 1000 | 2000 | 4000 | 8000 |
| Weight Ratio Polymer:Ions | 84 | 33 | 16.7 | 8.4 | 4.2 | 2.1 | 1.04 |

| Time | Gel Code | | | | | | |
| --- | --- | --- | --- | --- | --- | --- | --- |
| 1.0 | A | A | A | A | A | A | A |
| 2.0 | A | A | A | A | A | A | A |
| 3.0 | A | A | A | A | A | A | A |
| 4.0 | A | A | A | A | A | A | A |
| 5.0 | B | B | B | B | B | B | B |
| 6.0 | B | B | B | B | B | B | C |
| 7.0 | B | B | B | B | B | B | C |
| 8.0 | B | B | B | B | B | B | C |
| 24 | B | B | B | B | B | B | C |
| 175 | B | B | B | B | B | B | C |

EXAMPLE 24

| % Hydrolysis: | 30 |
| --- | --- |
| Polymer MW: | 5,000,000 |
| Polymer Conc: | 8350 |
| Polymer Solvent: | 5,000 ppm NaCl in aqueous solution |
| Polymer pH: | 4.0 |
| Temp: | rt |
| Metal Ion: | Aluminum III |
| Total Ions: | Aluminum III and Citrate |

| Run Number | 1 | 2 | 3 | 4 | 5 | 6 | 7 |
| --- | --- | --- | --- | --- | --- | --- | --- |
| Metal Ion Conc | 12.5 | 31 | 63 | 125 | 250 | 500 | 1000 |
| Total Ion Conc | 100 | 250 | 500 | 1000 | 2000 | 4000 | 8000 |
| Weight Ratio Polymer:Ions | 84 | 33 | 16.7 | 8.4 | 4.2 | 2.1 | 1.05 |

| Time | Gel Code | | | | | | |
| --- | --- | --- | --- | --- | --- | --- | --- |
| 0.5 | A | A | A | A | B | B | B |
| 0.75 | A | A | A | B | C | C | C |
| 1.75 | A | A | B | B | C | C | D |
| 2.5 | A | A | B | B | C | C | D |
| 3.0 | A | A | B | B | C | D | E |
| 3.5 | A | A | B | B | C | D | E |
| 4.5 | A | A | B | B | D | D | F |
| 6.0 | A | A | B | B | D | D | G |
| 24 | A | A | B | B | D | D | H |
| 48 | A | A | B | B | D | E | H |
| 71 | A | A | B | B | C | H | I |
| 166 | A | A | B | B | D | H | I |

EXAMPLE 25

| % Hydrolysis: | 30 |
| --- | --- |
| Polymer MW: | 5,000,000 |
| Polymer Conc: | 6000 |
| Polymer Solvent: | Actual Field Injection Water B* |
| Polymer pH: | 9.1 |
| Metal Ion: | Aluminum III |
| Total Ions: | Aluminum III and Citrate |

| Run Number | 1 | 2 | 3 | 4 | 5 | 6 |
| --- | --- | --- | --- | --- | --- | --- |
| Metal Ion Conc | 186 | 373 | 745 | 186 | 373 | 845 |
| Total Ion Conc | 1490 | 2980 | 5960 | 1490 | 2980 | 5960 |
| Weight Ratio Polymer:Ions | 4.0 | 2.0 | 1.0 | 4.0 | 2.0 | 1.0 |
| Temp | rt | rt | rt | 60 | 60 | 60 |

| Time | Gel Code | | | | | |
| --- | --- | --- | --- | --- | --- | --- |
| 0.5 | A | A | A | B | B | B |
| 1.0 | B | B | B | B | B | B |
| 2.0 | B | B | B | B | B | B |
| 3.0 | B | B | B | C | C | C |
| 4.0 | B | B | B | C | C | C |
| 5.0 | B | B | B | C | D | D |
| 6.0 | B | B | B | D | D | D |
| 24 | B | B | B | F | F | F |
| 48 | B | B | B | C | C | D |
| 120 | B | B | B | C | C | D |
| 172 | B | B | B | C | C | D |
| 216 | B | B | B | C | B | B |

*See Example 16 for composition.

EXAMPLE 26

Gelation solutions are prepared in the manner of Example 15.

| % Hydrolysis: | 30 |
| --- | --- |
| Polymer MW: | 5,000,000 |
| Polymer Conc: | 6000 |
| Polymer Solvent: | Actual Field Injection Water B* |
| Polymer pH: | 4.0 |
| Metal Ion: | Aluminum III |
| Total Ions: | Aluminum III and Citrate |

| Run Number | 1 | 2 | 3 | 4 | 5 | 6 |
| --- | --- | --- | --- | --- | --- | --- |
| Metal Ion Conc | 186 | 373 | 745 | 186 | 373 | 745 |
| Total Ion Conc | 1490 | 2980 | 5960 | 1490 | 2980 | 5960 |
| Weight Ratio Polymer:Ions | 4.0 | 2.0 | 1.0 | 4.0 | 2.0 | 1.0 |
| Temp | rt | rt | rt | 60 | 60 | 60 |

| Time | Gel Code | | | | | |
| --- | --- | --- | --- | --- | --- | --- |
| 0.25 | C | C | D | C | C | C |
| 0.50 | D | E | E | D | D | E |
| 1.0 | D | E | E | D | D | F |
| 2.0 | F | F | G | B | B | C |
| 3.0 | F | H | H | A | A | C |
| 4.0 | H | H | H | A | A | C |
| 5.0 | H | H | H | A | A | C |
| 6.0 | H | H | H | A | A | B |
| 24 | F | G | H | A | A | A |
| 48 | F | G | H | — | — | — |
| 120 | B | F | F | — | — | — |

*See Example 16 for composition.

EXAMPLE 27

| % Hydrolysis: | 30 |
| --- | --- |
| Polymer MW: | 5,000,000 |
| Polymer Conc: | 25,000 ppm |
| Polymer Solvent: | Denver Tap Water |
| Polymer pH: | 4.0 |
| Metal Ion: | Aluminum III |
| Total Ions: | Aluminum III and Citrate |

| Run Number | 1 | 2 | 3 | 4 | 5 | 6 | 7 | 8 |
| --- | --- | --- | --- | --- | --- | --- | --- | --- |
| Metal Ion Conc | 462 | 925 | 1850 | 3700 | 462 | 925 | 1850 | 3700 |
| Total Ion Conc | 3700 | 7400 | 14,800 | 29,600 | 3700 | 7400 | 14,800 | 29,600 |
| Weight Ratio Polymer:Ions | 6.8 | 34 | 1.7 | 0.84 | 6.7 | 3.3 | 1.7 | 0.84 |
| Temp | rt | rt | rt | rt | 60 | 60 | 60 | 60 |

-continued

| Time | | | Gel Code | | | | | |
|------|---|---|---|---|---|---|---|---|
| 0.5  | G | G | I | I | G | G | I | I |
| 1.0  | I | I | I | I | G | G | I | I |
| 2.0  | I | I | I | I | H | H | I | I |
| 3.0  | I | I | I | I | H | H | I | I |
| 4.0  | I | I | I | I | H | H | I | I |
| 5.0  | I | I | I | J | H | I | J | J |
| 6.0  | I | I | I | J | H | I | J | J |
| 55   | I | I | I | J | H | H | I | I |
| 104  | I | I | I | J | H | H | I | I |
| 168  | I | I | I | J | H | H | I | I |
| 288  | I | I | J | J | G | H | I | I |

EXAMPLE 28

| % Hydrolysis:     | 30 |
|-------------------|----|
| Polymer MW:       | 5,000,000 |
| Polymer Conc.:    | 25,000 ppm |
| Polymer Solvent:  | Denver Tap Water |
| Polymer pH:       | 9.6 |
| Metal Ion:        | Aluminum III |
| Total Ions:       | Aluminum III and Citrate |

| Run Number | 1 | 2 | 3 | 4 | 5 | 6 | 7 | 8 |
|---|---|---|---|---|---|---|---|---|
| Metal Ion Conc | 462 | 925 | 1850 | 3700 | 462 | 925 | 1850 | 3700 |
| Total Ion Conc | 3700 | 7400 | 14,800 | 29,600 | 3700 | 7400 | 14,800 | 29,600 |
| Weight Ratio Polymer:Ions | 6.8 | 3.4 | 1.7 | 0.84 | 6.7 | 3.3 | 1.7 | 0.84 |
| Temp | rt | rt | rt | rt | 60 | 60 | 60 | 60 |

| Time | | | Gel Code | | | | | |
|------|---|---|---|---|---|---|---|---|
| 0.5  | A | A | A | A | A | A | A | A |
| 1.0  | A | A | A | A | A | A | A | A |
| 2.0  | A | A | A | A | A | A | A | A |
| 3.0  | I | A | A | A | A | A | A | A |
| 4.0  | I | I | I | I | I | I | I | I |
| 5.0  | I | I | I | I | I | I | I | I |
| 6.0  | I | I | I | I | I | I | I | I |
| 55   | I | I | I | I | E | E | C | C |
| 104  | D | C | C | C | E | E | C | C |
| 168  | D | C | C | C | E | E | C | C |
| 288  | D | C | C | C | E | E | D | C |

Examples 23-28 show that non-flowing PHPA/aluminum citrate gels can only be formed at an acidic pH, e.g., around 4. Only flowing gels can be formed at neutral pH and require large amounts of aluminum citrate. Acidic pH conditions are particularly unsuitable to subterranean applications because they require acidic brines which are incompatible with many reservoirs. Acidic brines attack the formation, e.g., carbonates and dolomites, found either in the matrix or cementing material. Furthermore, low pH tends to precipitate the PHPA. Most reservoirs are neutral or slightly basic and consume hydrogen ions rendering acidic gel formulations basic and inoperative.

PHPA/aluminum citrate gels containing actual field brine do not form readily at room temperature but form quickly at a temperature of 60° C. However, these gels degrade badly in a time period of less than 48 hours.

EXAMPLE 29

| % Hydrolysis:    | 30 |
|------------------|----|
| Polymer MW:      | 5,000,000 |
| Polymer Conc:    | 8350 |
| Polymer Solvent: | 5,000 ppm NaCl in aqueous solution |
| Temp:            | rt |

| Run Number | 1 | 2 |
|---|---|---|
| Crosslinking Ions | CrIII, Cl | CrIII, NO₃ |
| Metal Ion Conc | 52.5 | 52.5 |
| Total Ion Conc | 270 | 405 |
| Weight Ratio PHPA:Ions | 30.1 | 20.6 |

| Time | Gel Code | |
|------|---|---|
| 1.0  | A | A |
| 2.0  | A | A |
| 3.0  | A | A |
| 4.0  | A | A |
| 6.0  | A | A |
| 9.0  | A | A |
| 24   | A | A |
| 48   | A | A |
| 96   | A | A |
| 336  | A | A |
| 672  | A | A |

Crosslinking occurs so rapidly that local gel balls form around the crosslinking agent solutions as they are added to the polymer solution preventing effective mixing and continuous gel formation.

EXAMPLE 30

Gelation solutions are prepared for runs 1–3 with crosslinking agent solutions containing 10% by wt. complexes. The crosslinking agent solution of run 1 is formed by adding a "Chromic Acetate 50% Solution" to water. The solution of run 2 is formed by dissolving solid CrAc₃.H₂O in water. The solution of run 3 is formed by dissolving solid Cr₃Ac₇(OH)₂ in water.

| % Hydrolysis:    | 30 |
|------------------|----|
| Polymer MW:      | 5,000,000 |
| Polymer Conc:    | 8350 |
| Polymer Solvent: | 5,000 ppm NaCl in aqueous solution |
| Polymer pH:      | 10.2 |
| Temp:            | rt |
| Total Ion Conc:  | 500 |
| Weight Ratio Polymer:Ions: | 16.7 |

| Run Number | 1 | 2 | 3 |
|---|---|---|---|
| Metal Ion Conc | 113 | 105 | 130 |

| Time | Gel Code | | |
|------|---|---|---|
| 0.5  | B | B | B |
| 1.0  | B | B | B |
| 2.0  | C | C | C |
| 3.0  | D | D | D |
| 4.0  | D | D | E |
| 5.0  | D | D | F |
| 6.0  | D | D | F |
| 7.0  | E | E | F |
| 24.0 | E | E | F |
| 48   | F | F | F |
| 168  | G | G | G |
| 312  | G | G | G |
| 600  | G | G | G |

Gelation rate and gel strength appear to be substantially independent of the chromium acetate compound used to make the crosslinking agent solution containing the complexes. The gel of run 3 gels slightly faster than the other two only because it has a higher concentration of chromium III ions at the same total ion concentration.

Examples 31–33 are field applications using flowing gels of the present invention made from PHPA.

EXAMPLE 31

1,020,000 liters of a predetermined aqueous gelation solution comprising PHPA and a crosslinking agent made up of chromium III and acetate ions are prepared. The gelation solution is prepared by mixing a "Chromic Acetate 50% Solution" diluted to 15% by weight with a PHPA solution containing 3040 kg of PHPA. Mixing is conducted in an injection line using a simple in-line mixer. The solvent of the gelation solution is a field water having a high $H_2S$ content.

The resulting gelation solution has a PHPA to chromium III and acetate ion ratio of 10:1 and a PHPA concentration of 3000 ppm. The solution is injected into an injection well in the Wyoming Big Horn Basin at a rate of 9900 liters/hr into a 37.2 meter perforation interval. The treatment zone is a highly fractured Pennyslvanian age sandstone formation.

Samples of the gelation solution are taken from the wellhead during injection. The samples are unfilterable through 8 micron filter paper at 345 kPa differential pressure. The viscosities of the samples are similar to those of comparable gels formulated under laboratory conditions as described in the preceding examples.

The injection wellhead pressure prior to treatment is on vacuum during injection of a 500 ppm PHPA solution at a rate of 9900 liters/hr. The injection wellhead pressure increases to 1380 kPa for injection of the 500 ppm PHPA solution at 9900 liters/hr immediately after termination of the present treatment. Two days after termination of the flowing gel treatment, the wellhead pressure is at 1240 kPa at the same injection conditions and remains at that pressure for six months. During this period, no chromium III ions are detected at any of the offset producing wells.

In comparison, a neighboring injection well in the same formation is treated with a PHPA gel formed from a chromium VI/redox crosslinking agent solution and the same field water of the previous gel. The chromium VI reduces very rapidly in the injection water resulting in poor mixing of the crosslinking agent with the PHPA and poor gel formation. 4,800,000 liters of the resulting solution are injected into the injection well being treated. No significant injectivity reduction is apparent from the treatment.

EXAMPLE 32

An injection well in a second formation of the Wyoming Big Horn Basin characterized as carbonate strata with an extensive fracture network having very open fractures is treated with a predetermined PHPA gel crosslinked with chromium III and acetate ions. 950,000 liters of the gelation solution containing a total of 12,200 kg of PHPA and having PHPA concentrations ranging from 3000 to 7000 ppm are injected into the injection well having tubulars perforated into 9 meters of the formation.

Prior to treatment, the injection wellhead pressure is on a strong vacuum when injecting a 500 ppm PHPA solution at 9,900 liters/hr. After the flowing gel treatment, the injection wellhead pressure increases to 690 kPa at the same injection conditions. Incremental oil production at two of the offset production wells in the 20-acre five-spot spacing is determined to exceed 132 liters/hr of oil after the gel treatment.

EXAMPLE 33

1,750,000 liters of a predetermined gelation solution containing 10,400 kg of PHPA and chromium III and acetate ions are prepared and injected into an injection well communicating with the lower 46 meters of a third formation in the Wyoming Big Horn Basin. The formation is characterized as carbonate strata with an extensive fracture network having a very open fractures. The PHPA concentration range of the flowing gel is from 4000 to 8500 ppm. Downhole pressure to water injection at a rate of 6600 liters/hr increases from 1730 kPa prior to application of the treatment to 9450 kPa after the flowing gel treatment.

EXAMPLE 34

A production well in a formation of the Wyoming Big Horn Basin, which is characterized as carbonate strata at a temperature of 58° C. and which is fractured and possibly overacidized, produces 106 liters/hr of oil and 29,000 liters/hr of water over a perforation interval of about 3.4 meters. The well is uneconomic and is shut in due to excessive water production. The produced water has a high $H_2S$ content and is expensive to dispose.

31,800 liters of a predetermined polyacrylamide/chromium III and acetate gelation solution are pumped into the production well at a rate of 19,000 liters/hr. Fresh water is the solvent of the gelation solution. The polyacrylamide concentration of the gelation solution is 2% and the polyacrylamide has an average molecular weight of 11 million. The weight ratio of polyacrylamide to chromium III and acetate ions in the gelation solution is 20:1. The gelation solution sets up in the formation as a non-flowing gel. Thereafter, the well is returned to production. The resulting oil production is increased to an economic level of over 660 liters/hr while the water production is reduced to less than 13,200 liters/hr.

EXAMPLE 35

A series of laboratory floods are conducted to evaluate the performance of non-flowing rigid polyacrylamide gels of the present invention formed from a chromium III and acetate ion crosslinking agent for improved conformance treatment of an oil production well. A sandpack containing 40 to 60 mesh sand and having a permeability of about 10 darcies simulates the high-conductivity field zones requiring improved conformance treatment.

The gelation solution is injected into a wellbore in the center of the sandpack. After treatment, water is injected into the outside of the sandpack and produced from the center wellbore. Pressure measurements for two rings around the center wellbore allow monitoring of fluid mobility and permeability throughout the tests. The floods are conducted at reservoir conditions of 55° C. using field produced water and crude. The gel is comprised of a 20,000 ppm polyacrylamide solution. The polyacrylamide is substantially unhydrolyzed and has a molecular weight of about 5,000,000. The weight ratio of polyacrylamide to chromium III and acetate ions is about 10:1.

Table 1 below shows the typical results for a non-flowing rigid gel treatment in a 100% water saturated sandpack. The gel reduces the permeability of the sandpack from 15,000 md to 0.25 md, which is a factor of 60,000. Permeability after treatment increases only slightly with increasing throughput and increasing pressure.

TABLE 1

| Treatment Sequence | Ring #1 (0-0.074 PV) | Ring #2 (0-0.297 PV) |
|---|---|---|
| Initial Brine Permeability, md | 13,000 | 15,100 |
| Inject 0.19 PV Gel at 192 cc/hr | | |
| Reciprocal Relative Mobility, cp | 1,500 | 2,100 |
| Inject 0.03 PV Brine at 192 cc/hr | | |
| Reciprocal Relative Mobility, cp | 14 | 16 |
| 21.7-hr Shut-in Prior to Backflow | | |
| Inject 0.12 PV Brine at 6 cc/hr | | |
| Reciprocal Relative Mobility, cp | 35,000 | 124,000 |
| Permeability Reduction | 69,000 | 242,000 |
| Permeability, md | 0.19 | 0.062 |
| Produced Chromium Conc., ppm | | 3.9-2.9 |
| Inject 0.79 PV Brine at 12 cc/hr | | |
| Reciprocal Relative Mobility, cp | 63,000 | 82,000 |
| Permeability Reduction | 124,000 | 161,000 |
| Permeability, md | 0.104 | 0.094 |
| Produced Chromium Conc., ppm | | 3.1-1.6 |
| Inject 0.18 PV Brine at 24 cc/hr | | |
| Reciprocal Relative Mobility, cp | 41,000 | 49,000 |
| Permeability Reduction | 80,000 | 96,000 |
| Permeability, md | 0.16 | 0.16 |
| Produced Chromium Conc., ppm | | 1.8-1.1 |
| Inject 0.50 PV Brine at 48 cc/hr | | |
| Reciprocal Relative Mobility, cp | 26,000 | 33,000 |
| Permeability Reduction | 52,000 | 65,000 |
| Permeability, md | 0.25 | 0.23 |
| Produced Chromium Conc., ppm | | 1.3-0.6 |

Viscosity of Brine at 55° C. = 0.51 cp

The test is repeated using a much smaller gel treatment volume of 0.08 PV rather than the 0.19 PV shown in Table 1. The permeability reductions are nearly identical to those shown in Table 1.

A second series of tests are conducted to observe the effects of oil saturation. The sandpack is first flooded with a Wyoming crude from a Big Horn Basin Field and then flooded with a 2 PV of produced water. The sandpack is then treated with the gel and resulting permeability reduction to oil and water are recorded. The results are shown in Table 2 below. Post-treatment water permeability is from about 1 to 2 md compared to 0.25 md for the oil-free flood shown in Table 1. As in Table 1, the permeability increases only slightly with increasing throughput and pressure. Furthermore, the treatment appears to be equally effective using a treatment volume which is half the volume of that shown in Table 2.

TABLE 2

| Treatment Sequence | Ring #1 (0-0.074 PV) | Ring #2 (0-0.297 PV) |
|---|---|---|
| Initial Brine Permeability, md | 8,700 | 8,800 |
| Inject 1.27 PV Crude Oil at 192 cc/hr | | |
| Oil Saturation, PV | | 0.774 |
| Mobility, md/cp | 24 | 15 |
| Reciprocal Relative Mobility, cp | 370 | 580 |
| Inject 2.06 PV Brine at 192 cc/hr (Backflow) | | |
| Oil Saturation, PV | | 0.298 |
| Mobility, md/cp | 630 | 1,300 |
| Reciprocal Relative Mobility, cp | 14 | 7.0 |
| Inject 0.164 PV Gel at 192 cc/hr | | |
| Oil Saturation, PV | | 0.298 |
| Mobility, md/cp | 8.6 | 6.8 |
| Reciprocal Relative Mobility, cp | 1,000 | 1,300 |
| Inject 0.030 PV Brine at 192 cc/hr | | |
| Oil Saturation, PV | | 0.298 |
| 23.8-hr Shut-in Prior to Brine Backflow | | |
| Inject 0.38 PV Brine at 6 cc/hr | | |
| Oil Saturation, PV | | 0.169 |
| Mobility, md/cp | 0.19 | 0.09 |
| Reciprocal Relative Mobility, cp | 47,000 | 93,000 |
| Mobility Reduction | >3,400 | >13,000 |
| Water Relative Permeability, md | <0.09 | <0.05 |
| Produced Chromium Conc., ppm | | 10.9-5.1 |
| Inject 0.21 PV Brine at 12 cc/hr | | |
| Oil Saturation, PV | | 0.168 |
| Mobility, md/cp | 0.33 | 0.21 |
| Reciprocal Relative Mobility, cp | 27,000 | 43,000 |
| Mobility Reduction | >1,900 | >6,100 |
| Water Relative Permeability, md | <0.17 | <0.10 |
| Produced Chromium Conc., ppm | | 5.19-2.65 |
| Inject 0.12 PV Brine at 48 cc/hr | | |
| Oil Saturation, PV | | 0.167 |
| Mobility, md/cp | 1.1 | 0.61 |
| Reciprocal Realtive Mobility, cp | 7,800 | 14,000 |
| Mobility Reduction | >560 | >2,100 |
| Water Relative Permeability, md | <0.57 | <0.31 |
| Produced Chromium Conc., ppm | | 2.94-1.38 |
| Inject 0.24 PV Brine at 192 cc/hr | | |
| Oil Saturation, PV | | 0.165 |
| Mobility, md/cp | 3.4 | 1.6 |
| Reciprocal Relative Mobility, cp | 2,600 | 5,600 |
| Mobility Reduction | >190 | >800 |
| Water Relative Permeability, md | <1.7 | <0.80 |
| Produced Chromium Conc., ppm | | 1.77-0.70 |
| Inject 0.23 PV Brine at 384 cc/hr | | |
| Oil Saturation, PV | | 0.164 |
| Mobility, md/cp | 3.4 | 2.0 |
| Reciprocal Relative Mobility, cp | 2,600 | 4,500 |
| Mobility Reduction | >190 | >640 |
| Water Relative Permeability, md | <1.7 | <1.0 |
| Produced Chromium Conc., ppm | | 1.15-0.87 |

Viscosity of Brine at 55° C. = 0.51 cp
Viscosity of Crude Oil at 55° C. = 18.5 cp The initial waterflood described in Table 2 recovers 61.5% of the original oil in place. Oil saturation is reduced from 0.774 to 0.298 PV. The waterflood is resumed after the non-flowing rigid gel treatment and initial production of oil contains substantially no water. Posttreatment waterflooding produces an additional 0.134 PV of oil which is 17.3% of the oil in place.

The initial large increase in oil cut by waterflooding results from the gel treatment. As indicated by Tables 1 and 2, the gel nearly eliminates all water relative permeability in the vicinity of the production well but reduces oil relative permeability to a much lesser extent. Therefore, oil is more readily produced relative to injection water. The injected water is not produced until after the mobile oil saturation is produced.

While the foregoing preferred embodiments of the invention have been described and shown, it is understood that the alternatives and modifications, such as those suggested and others, may be made thereto and follow in the scope of the invention.

We claim:
1. A process for substantially plugging at least one relatively high permeability region bounded by at least one relatively low permeability region in a hydrocarbon-bearing formation below an earthen surface, said formation penetrated by a wellbore in fluid communication with said at least one relatively high permeability region, the process consisting essentially of the steps of:
(a) predetermining the gelation rate, gel strength and gel stability required of a gel to meet the treatment demands of the formation at said at least one relatively high permeability region;
(b) providing a gelation solution at said earthen surface capable of forming a crosslinked gel having the required predetermined gelation rate, gel strength and gel stability, said gelation solution consisting essentially of a water-soluble acrylamide polymer, a complex capable of crosslinking said polymer and formed of at least one electropositive chromium III species and at least one electronegative carboxylate species, and a solvent for said polymer and said complex, wherein the concentration of said polymer in said solution is less than about 200,000 ppm and the weight ratio of said polymer to said complex in said solution is about 1:1 to about 500:1;
(c) injecting said gelation solution into said formation via said wellbore;
(d) moving said gelation solution to said at least one relatively high permeability region; and
(e) crosslinking said gelation solution substantially to completion in said at least one relatively high permeability region to form said crosslinked gel having the required predetermined gelation rate, gel strength and gel stability to substantially plug said at least one relatively high permeability region.

2. A crosslinked polymer gel prepared according to the process of claim 1.

3. A process for substantially plugging at least one relatively high permeability region bounded by at least one relatively low permeability region in a hydrocarbon-bearing formation below an earthen surface, said formation penetrated by a wellbore in fluid communication with said at least one relatively high permeability region, the process consisting essentially of the steps of:
(a) predetermining the gelation rate, gel strength and gel stability required of a gel to meet the treatment demands of the formation at said at least one relatively high permeabiity region;
(b) providing a gelation solution at said earthen surface capable of forming a crosslinked gel having the required predetermined gelation rate, gel strength and gel stability, said gelation solution consisting essentially of a water-soluble acrylamide polymer, a complex capable of crosslinking said polymer and formed of at least one electropositive chromium III species, at least one electronegative carboxylate species, and at least one species selected from the group consisting of electronegative oxygen species, electronegative hydroxide species, inorganic monovalent ions, inorganic divalent ions, water molecules and mixtures thereof, and a solvent for said polymer and said complex, wherein the concentration of said polymer in said solution is less than about 200,000 ppm and the weight ratio of said polymer to said complex in said solution is about 1:1 to about 500:1;
(c) injecting said gelation solution into said formation via said wellbore;
(d) moving said gelation solution to said at least one relatively high permeability region; and
(e) crosslinking said gelation solution substantially to completion in said at least one relatively high permeability region to form said crosslinked gel having the required predetermined gelation rate, gel strength and gel stability to substantially plug said at least one relatively high permeability region.

4. A crosslinked polymer gel prepared according to the process of claim 3.

5. A process for substantially plugging at least one relatively high permeability region bounded by at least one relatively low permeability region in a hydrocarbon-bearing formation below an earthen surface penetrated by a wellbore in fluid communication with said at least one relatively high permeability region, the process consisting essentially of the steps of:
(a) predetermining the gelation rate, gel strength and gel stability required of a gel to meet the treatment demands of the formation at said at least one relatively high permeability region;
(b) providing a gelation solution at said earthen surface capable of forming an injectable crosslinked gel having the required predetermined gelation rate, strength and stability, said gelation slution consisting essentially of a water-soluble acrylamide polymer, a complex capable of crosslinking said polymer and formed of at least one electropositive chromium III species and at least one electronegative carboxylate species, and a solvent for said polymer and said complex, wherein the concentration of said polymer in said gelation solution is less than about 200,000 ppm and the weight ratio of said polymer to said complex in said solution is about 1:1 to about 500:1;
(c) crosslinking said gelation solution substantially to completion at said earthen surface to form said crosslinked gel, wherein said gel is flowing and has the required predetermined gelation rate, gel strength and gel stability to substantially plug said at least one relatively high permeability region;
(d) injecting said gel into said formation via said wellbore;
(e) moving said gel to said at least one relatively high permeability region; and
(f) forming said gel from said gelation solution having the required predetermined gelation rate, gel strength and gel substantially plugging said at least one relatively high permeability region with said gel.

6. A crosslinked polymer gel prepared according to the process of claim 5.

7. A process for substantially plugging at least one relatively high permeability region bounded by at least one relatively low permeability region in a hydrocarbon-bearing formation below an earthen surface penetrated by a wellbore in fluid communication with said at least one relatively high permeability region, the process consisting essentially of the steps of:
(a) predetermining the gelation rate, gel strength and gel stability required of a gel to meet the treatment demands of the formation at said at least one relatively high permeability region;
(b) providing a gelation solution at said earthen surface capable of forming an injectable crosslinked gel having the required predetermined gelation rate, strength and stability, said gelation solution consisting essentially of a water-soluble acrylamide polymer, a complex capable of crosslinking said polymer and formed of at least one electropositive chromium III species, at least one electronegative carboxylate species, and at least one species selected from the group consisting of electronegative oxygen species, electronegative hydroxide species, inorganic monovalent ions, inorganic divalent ions, water molecules and mixtures thereof, and a solvent for said polymer and said complex, wherein the concentration of said polymer in said solution is less than about 200,000 ppm and the weight ratio of said polymer to said complex in said solution is about 1:1 to about 500:1;

(c) crosslinking said gelation solution substantially to completion at said earthen surface to form said crosslinked gel, wherein said gel is flowing and has the required predetermined gelation rate, gel strength and gel stability to substantially plug said anomaly at least one relatively high permeability region;

(d) injecting said gel into said formation via said wellbore;

(e) moving said gel to said at least one relatively high permeability region; and (f) substantially plugging said at least one relatively high permeability region with said gel.

8. A crosslinked polymer gel prepared according to the process of claim 7.

9. A process for substantially plugging at least one relatively high permeability region bounded by at least one relatively low permeability region in a hydrocarbon-bearing formation below an earthen surface, said formation penetrated by a wellbore in fluid communication withh said at least one relatively high permeability region, the process consisting essentially of the steps of:

(a) preparing a gelation solution at the surface consisting essentially of a water-soluble acrylamide polymer, a complex capable of crosslinking said polymer and formed of at least one electropositive chromium III species and at least one electronegative carboxylate species, and a solvent for said polymer and said complex;

(b) injecting said gelation solution into said wellbore;

(c) displacing said gelation solution into said at least one relatively high permeability region; and (d) crosslinking said gelation solution substantially to completion in said at least one relatively high permeability region to form a crosslinked gel which substantially plugs said at least one relatively high permeability region.

10. The process of claim 9 wherein said gelation solution is partially gelled upon injection such that said gelation solution is sufficiently flowing to penetrate said at least one relatively high permeability region but is sufficiently gelled to prevent substantial penetration of said at least one relatively low permeability region.

11. The process of claim 9 wherein said wellbore is a hydrocarbon production wellbore.

12. The process of claim 11 wherein the rate of hydrocarbon production from said hydrocarbon production wellbore is substantially increased by said process.

13. The process of claim 9 wherein said wellbore is a fluid injection wellbore.

14. The process of claim 9 wherein said carboxylate species is selected from the group consisting of formate, acetate, propionate, lactate, lower substituted derivatives thereof, and mixtures thereof.

15. The process of claim 9 wherein said gel is a flowing gel.

16. The process of claim 15 wherein said acrylamide polymer is partially hydrolyzed polyacrylamide.

17. The process of claim 9 wherein said gelation solution is substantially ungelled upon injection.

18. The process of claim 9 wherein said at least one relatively high permeability region is an anomaly and said at least one relatively low permeability region is a matrix.

19. The process of claim 9 wherein said at least one relatively high permeability region is a first zone of a matrix and said at least one relatively low permeability region is a second zone of a matrix.

20. The process of claim 9 wherein said gel is a nonflowing gel.

21. The process of claim 20 wherein said acrylamide polymer is polyacrylamide.

22. A process for substantially plugging at least one relatively high permeability region bounded by at least one relatively low permeability region in a hydrocarbon-bearing formation below an earthen surface, said formation penetrated by a wellbore in fluid communication with said at least one relatively high permeability region, the process consisting essentially of the steps of:

(a) preparing a gelation solution at the surface consisting essentially of a water-soluble acrylamide polymer, a complex capable of crosslinking said polymer and formed of at least one electropositive chromium III species, at least one electronegative carboxylate species, and at least one species selected from the group consisting of electronegative oxygen species, electronegative hydroxide species, inorganic monovalent ions, inorganic divalent ions, water molecules, and mixtures thereof, and a solvent for said polymer and said complex;

(b) injecting said gelation solution into said wellbore;

(c) displacing said gelation solution into said at least one relatively high permeability region; and (d) crosslinking said gelation solution substantially to completion in said at least one relatively high permeability region to form a crosslinked gel which substantially plugs said at least one relatively high permeability region.

23. The process of claim 22 wherein said gelation solution is partially gelled upon injection such that said gelation solution is sufficiently flowing to penetrate said at least one relatively high permeability region but is sufficient gelled to prevent substantial penetration of said at least one relatively low permeability region.

24. The process of claim 22 wherein said wellbore is a hydrocarbon production wellbore.

25. The process of claim 24 wherein the rate of hydrocarbon production from said hydrocarbon production wellbore is substantially increased by said process.

26. The process of claim 22 wherein said wellbore is a fluid injection wellbore.

27. The process of claim 22 wherein said carboxylate species is selected from the group consisting of formate, acetate, propionate, lactate, lower substituted derivatives thereof, and mixtures thereof.

28. The process of claim 22 wherein said gel is a flowing gel.

29. The process of claim 28 wherein said acrylamide polymer is partially hydrolyzed polyacrylamide.

30. The process of claim 22 wherein said gelation solution is substantially ungelled upon injection.

31. The process of claim 22 wherein said at least one relatively high permeability region is an anomaly and said at least one relatively low permeability region is a matrix.

32. The process of claim 22 wherein said at least one relatively high permeability region is a first zone of a matrix and said at least one relatively low permeability region is a second zone of a matrix.

33. The process of claim 22 wherein said gel is a non-flowing gel.

34. The process of claim 33 wherein said acrylamide polymer is polyacrylamide.

35. A process for substantially reducing the permeability of at least one relatively high permeability region bounded by at least one relatively low permeability region in a hydrcarbon-bearing formation matrix below an earthen surface penetrated by a wellbore in fluid communication with said at least one relatively high permeability region, the process consisting essentially of the steps of:
  (a) preparing a gelation solution at the surface consisting essentially of a water-soluble acrylamide polymer, a complex capable of crosslinking said polymer and formed of at least one electropositive chromium III species and at least one electronegative carboxylate species, and a solvent for said polymer and said complex;
  (b) crosslinking said gelation solution substantially to completion at said earthen surface to form an injectable crosslinked flowing gel;
  (c) injecting said gel into said wellbore;
  (d) displacing said gel into said at least one relatively high permeability region to substantially plug said at least one relatively high permeability region.

36. The process of claim 35 wherein said carboxylate species is selected from the group consisting of formate, acetate, proprionate, lactate, lower substituted derivatives thereof, and mixtures thereof.

37. The process of claim 35 wherein said at least one relatively high permeability region is an anomaly and said at least one relatively low permeability region is a matrix.

38. The process of claim 35 wherein said at least one relatively high permeability region is a first zone of a matrix and said at least one relatively low permeability region is a second zone of a matrix.

39. The process of claim 35 wherein said wellbore is a hydrocarbon production wellbore.

40. The process of claim 39 wherein a fluid comprising hydrocarbon and water is produced from said hydrocarbon production wellbore and the ratio of water to hydrocarbon in said fluid is substantially reduced by said process.

41. The process of claim 39 wherein the rate of hydrocarbon production from said hydrocarbon production wellbore is substantially increased by said process.

42. The process of claim 35 wherein said wellbore is a fluid injection wellbore.

43. A process for substantially reducing the permeability of at least one relatively high permeability region bounded by at least one relatively low permeability region in a hydrocarbon-bearing formation matrix below an earthen surface penetrated by a wellbore in fluid communication with said at least one relatively high permeability region, the process consisting essentially of the steps of:
  (a) preparing a gelation solution at the surface consisting essentially of a water-soluble acrylamide polymer, a complex capable of crosslinking said polymer, said complex and formed of at least one electropositive chromium III species, at least one electronegative carboxylate species, and at least one species selected from the group consisting of electronegative oxygen species, electronegative hydroxide species, inorganic monovalent ions, inorganic divalent ions, water molecules, and mixtures thereof and a solvent for said polyymer and said complex;
  (b) crosslinking said gelation solution substantially to completion at said earthen surface to form an injectable crosslinked flowing gel;
  (c) injecting said gel into said wellbore;
  (d) displacing said gel into said at least one relatively high permeability region to substantially plug said at least one relatively high permeability region.

44. The process of claim 43 wherein said carboxylate species is selected from the group consisting of formate, acetate, proprionate, lactate, lower substituted derivatives thereof, and mixtures thereof.

45. The process of claim 43 wherein said at least one relatively high permeability region is an anomaly and said at least one relatively low permeability region is a matrix.

46. The process of claim 43 wherein said at least one relatively high permeability region is a first zone of a matrix and said at least one relatively low permeability region is a second zone of a matrix.

47. The process of claim 43 wherein said wellbore is a hydrocarbon production wellbore.

48. The process of claim 47 wherein a fluid comprising hydrocarbon and water is produced from said hydrocarbon production wellbore and the ratio of water to hydrocarbon in said fluid is substantially reduced by said process.

49. The process of claim 47 wherein the rate of hydrocarbon production from said hydrocarbon production wellbore is substantially increased by said process.

50. The process of claim 43 wherein said wellbore is a fluid injection wellbore.

51. A process for substantially reducing the ratio of water to hydrocarbon in a fluid being produced from a hydrocarbon production wellbore by substantially plugging at least one relatively high permeability region bounded by at least one relatively low permeability region in a hydrocarbon-bearing formation below an earthen surface, said formation penetrated by said wellbore in fluid communication with said at least one relatively high permeability region, the process consisting essentially of the steps of:
  (a) preparing a gelation solution at the surface consisting essentially of a water-soluble polyacrylamide, a complex capable of crosslinking said polyacrylamide and formed of at least one electropositive chromium III species and at least one electronegative carboxylate species, and a solvent for said polymer and said complex;
  (b) injecting said gelation solution into said wellbore;
  (c) displacing said gelation solution into said at least one relatively high permeability region;
  (d) crosslinking said gelation solution substantially to completion in said at least one relatively high permeability region to form a crosslinked gel which substantially plugs said at least one relatively high permeability region; and
  (e) producing said fluid from said wellbore wherein the ratio of water to hydrocarbon in said fluid is substantially reduced after said at least one relatively high permeability region is substantially plugged.

52. A process for substantially reducing the ratio of water to hydrocarbon in a fluid being produced from a hydrocarbon production wellbore by substantially plugging at lest one relatively high permeability region bounded by at least one relatively low permeability region in a hydrocarbon-bearing formation below an earthen surface, said formation penetrated by said wellbore in fluid communication with said at least one relatively high permeability region, the process consisting essentially of the steps of:

(a) preparing a gelation solution at the surface consisting essentially of a water-soluble polyacrylamide, a complex capable of crosslinking said polyacrylamide and formed of at least one electropositive chromium III species, at least one electronegative carboxylate species, and at least one species selected from the group consisting of electronegative oxygen species, electronegative hydroxide species, inorganic monovalent ions, inorganic divalent ions, water molecules, and mixtures thereof, and a solvent for said polymer and said complex;

(b) injecting said gelation solution into said wellbore;

(c) displacing said gelation solution into said at least one relatively high permeability region;

(d) crosslinking said gelation solution substantially to completion in said at least one relatively high permeability region to form a crosslinked gel which substantially plugs said at least one relatively high permeability region; and (e) producing said fluid from said wellbore wherein the ratio of water to hydrocarbon in said fluid is substantially reduced after said at least one relatively high permeability region is substantially plugged.

53. The process of claim 1 wherein said carboxylate species is acetate.

54. The process of claim 3 wherein said carboxylate species is acetate.

55. The process of claim 5 wherein said carboxylate species is acetate.

56. The process of claim 7 wherein said carboxylate species is acetate.

57. The process of claim 9 wherein said carboxylate species is acetate.

58. The process of claim 22 wherein said carboxylate species is acetate.

59. The process of claim 35 wherein said carboxylate species is acetate.

60. The process of claim 43 wherein said carboxylate species is acetate.

61. The process of claim 51 wherein said carboxylate species is acetate.

62. The process of claim 52 wherein said carboxylate species is acetate.

* * * * *

UNITED STATES PATENT AND TRADEMARK OFFICE
CERTIFICATE OF CORRECTION

PATENT NO. : 4,683,949

DATED : August 4, 1987

INVENTOR(S) : Robert D. Sydansk and Perry A. Argabright

It is certified that error appears in the above-identified patent and that said Letters Patent are hereby corrected as shown below:

| | |
|---|---|
| Col. 5, line 1: | After "non-flowing" insert --gel--. |
| Col. 7, line 7: | Delete "turned" and insert --termed--. |
| Col. 8, line 67: | Delete "dilution" and insert --diluting--. |
| Col. 17, line 52: | Delete "a". |
| Col. 18, line 63: | Delete "of". |
| Col. 26, line 9: | Delete "a". |
| Col. 27, line 42: | After "water" delete "are" and insert --is--. |
| Col. 30, line 17: | Delete "slution" and insert --solution--. |
| Col. 30, lines 38-40: | Delete "forming said gel from said gelation solution having the required predetermined gelation rate, gel strength and gel". |
| Col. 31, line 11: | Delete "anomaly". |
| Col. 31, line 26: | Delete "withh" and insert --with--. |
| Col. 32, line 42: | Delete "sufficient" and insert --sufficiently--. |
| Col. 33, line 62: | Delete "said complex". |
| Col. 34, line 1: | Delete "polyymer" and insert --polymer--. |
| Col. 34, line 67: | Delete "lest" and insert --least--. |

Signed and Sealed this

Fifth Day of April, 1988

Attest:

DONALD J. QUIGG

Attesting Officer

Commissioner of Patents and Trademarks